US010609687B2

(12) United States Patent
Yu et al.

(10) Patent No.: US 10,609,687 B2
(45) Date of Patent: *Mar. 31, 2020

(54) DUPLEX COMMUNICATION METHOD, BASE STATION AND TERMINAL

(71) Applicant: Samsung Electronics Co., Ltd., Suwon-si, Gyeonggi-do (KR)

(72) Inventors: Bin Yu, Beijing (CN); Chen Qian, Beijing (CN); Chengjun Sun, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/044,992

(22) Filed: Jul. 25, 2018

(65) Prior Publication Data

US 2018/0332573 A1 Nov. 15, 2018

Related U.S. Application Data

(63) Continuation of application No. 15/349,999, filed on Nov. 11, 2016, now Pat. No. 10,070,422.

(30) Foreign Application Priority Data

Nov. 13, 2015 (CN) .......................... 2015 1 0779297

(51) Int. Cl.
*H04W 4/00* (2018.01)
*H04W 72/04* (2009.01)
(52) U.S. Cl.
CPC .... *H04W 72/0406* (2013.01); *H04W 72/0453* (2013.01)

(58) Field of Classification Search
CPC ......... H04W 72/0406; H04W 72/0453; H04W 76/046
See application file for complete search history.

(56) References Cited

U.S. PATENT DOCUMENTS 8,547,884 B2 10/2013 Lo et al.
10,070,422 B2 * 9/2018 Yu ..................... H04W 72/0406
(Continued)

FOREIGN PATENT DOCUMENTS

EP 2229020 A1 9/2010

OTHER PUBLICATIONS

Foreign Communication from Related Counterpart Application; PCT Application No. PCT/KR2016/013036; International Search Report dated Feb. 15, 2017; 3 pages.

(Continued)

*Primary Examiner* — Minh Trang T Nguyen

(57) ABSTRACT

The present disclosure relates to a pre-5th-Generation (5G) or 5G communication system to be provided for supporting higher data rates beyond 4th-Generation (4G) communication system such as Long Term Evolution (LTE). A bidirectional communication method and an apparatuses thereof are provided. An uplink control channel and a downlink control channel are respectively transmitted in a first subband and a third subband of an available un-paired spectrum, wherein control channels of reverse directions are transmitted at the same time in the first subband and the third subband, and uplink data and downlink data are transmitted in a time division multiplexing manner in a second subband of the available un-paired spectrum, wherein the first subband and the third subband are on the two ends of the available un-paired spectrum.

20 Claims, 17 Drawing Sheets

(56) References Cited

U.S. PATENT DOCUMENTS

2006/0077931 A1   4/2006  Lee et al.
2012/0257551 A1  10/2012  Diao et al.
2014/0086115 A1   3/2014  Sorond et al.
2014/0233437 A1   8/2014  Abdoli et al.

OTHER PUBLICATIONS

Foreign Communication from Related Counterpart Application; PCT Application No. PCT/KR2016/013036; Written Opinion of the International Searching Authority dated Feb. 15, 2017; 5 pages.
"In-band Full Duplex Radios and System Performance", IEEE 802.11-15-0043-00-00ax; Jan. 12, 2015; 35 pages.

\* cited by examiner

DUPLEX COMMUNICATION METHOD, BASE STATION AND TERMINAL

CROSS-REFERENCE TO RELATED APPLICATIONS AND CLAIM OF PRIORITY

The present application is a continuation of U.S. application Ser. No. 15/349,999, filed Nov. 11, 2016, which is related to and claims priority under 35 U.S.C. § 119(a) of a Chinese patent application filed in the Chinese Intellectual Property Office on Nov. 13, 2015 and assigned Serial No. 201510779297.0, the entire disclosures of which are incorporated herein by reference.

BACKGROUND

1. Field

The present disclosure relates to wireless communication techniques, and more particularly, to a duplex communication method, a base station and a terminal.

2. Description of Related Art

To meet the demand for wireless data traffic having increased since deployment of 4G (4th-Generation) communication systems, efforts have been made to develop an improved 5G (5th-Generation) or pre-5G communication system. Therefore, the 5G or pre-5G communication system is also called a 'beyond 4G network' or a 'post LTE system'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

With rapid development of information industry, especially increasing requirements from mobile Internet and Internet of things (IoT), mobile communication techniques are facing unprecedented challenges. According to International Telecommunication Union (ITU) report ITU-R M.[MT.BEYOND2020.TRAFFIC], it can be predicted that as of 2020, mobile service amount will increase 1000 times compared with 2010 (4G era), and the connected user devices will exceed 17 billion. With involvement of IoT devices into the mobile communication networks, the number of connected user devices may be more astonishing. Under the unprecedented challenges, communication industry and the academia have started intensive researches in fifth generation mobile communication techniques (5G) facing 2020. At present, architecture and global objective of future 5G have been discussed in the ITU report ITU-R M.[IMT.VISION], which provides detailed description to requirement prospect, application scenarios and various important performances of 5G. With respect to new requirement of 5G, the ITU report ITU-R M.[MT.FUTURE TECHNOLOGY TRENDS] provides information related to technology trends of 5G, aims to solve dramatic problems such as system throughput, user experience consistency, extendibility, supporting IoT, tendency, efficient, cost, network flexibility, supporting of new services and flexible spectrum utilization.

Duplex mode in wireless communications refers to a processing manner of uplink and downlink bidirectional data communications and forms an important basis for air-interface design of the wireless communications, which is no exception in the research of 5G. At present, Frequency Division Duplex (FDD) and Time Division Duplex (TDD) are two main duplex modes and have been widely used in broadcast audio and video fields and civil communication systems, e.g., Long Term Evolution (LTE) system corresponding to the Evolved Universal Terrestrial Radio Access (E-UTRA) protocol defined by 3rd Generation Partnership Project (3GPP), IEEE 802.11a/g Wireless Local Area (WLAN), etc.

In the FDD mode, uplink and downlink communications use paired frequency resources having a certain duplex spacing. However, in the TDD mode, uplink and downlink share the same frequency resources, and uplink communication and downlink communication are implemented via different time resources. Different duplex modes result in different physical layer designs for air interface such as frame structure. Take LTE as an example, two kinds of frame structures are defined in LTE respectively applicable for the FDD mode and the TDD mode.

The FDD frame structure is as shown in FIG. 1. Each radio frame is of 10 ms length, consists of ten 1 ms subframes. Each subframe consists of two 0.5 ms slots. Uplink communication and downlink communication are implemented using different frequency resources.

The TDD frame structure is as shown in FIG. 2. Similar as the FDD frame structure, each radio frame is of 10 ms length, consists of ten 1 ms subframes. The difference relies in that, the uplink communication and downlink communication in the TDD mode share the same frequency resources and are differentiated through time resources. For example, in the configuration as shown in FIG. 2, subframes 0, 5 are used for downlink communication, and subframes 2, 3, 4, 7, 8 and 9 are used for uplink communication. In order to ensure that the downlink communication does not affect the uplink communication, a special subframe is introduced in the TDD frame structure, i.e., the subframes 1 and 6 as shown in FIG. 2. The special subframe consists of a Downlink Pilot Time Slot (DwPTS), a Guard Period (GP) and an Uplink Pilot Time Slot (UpPTS). In the TDD frame structure, subframes 1, 5 and the DwPTS are always used for downlink transmission, whereas UpPTS and its subsequent subframes are always used for uplink transmission. The GP is a guard period between the downlink communication and the uplink communication, so as to ensure that the uplink data communication is not affected by the downlink communication. The LTE TDD mode may be configured flexibly, so as to support uplink/downlink asymmetric services. Table 1 shows various configurations of the LTE TDD mode, wherein D denotes that the subframe is used for downlink communication, U denotes that the subframe is used for uplink communication, and S denotes the special subframe.

TABLE 1 uplink-downlink configurations of LTE TDD mode

| Uplink-downlink configuration | Downlink-uplink switching periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

The above two duplex modes each have their advantages and disadvantages. In particular, the FDD mode requires paired frequency bands to implement uplink and downlink data communications, and the paired uplink and downlink frequency bands need a certain duplex spacing. In the case that 5G is developed towards high frequency and wide bandwidth, it may result in spectrum fragments from the perspective of spectrum division and thus is not good for spectrum management. The TDD mode uses the same spectrum for the uplink and downlink data communications. Therefore, the TDD mode has advantages in terms of spectrum utilization flexibility. It can support more asymmetric services and have higher spectrum utilization ratio. As to the FDD, since the spectrum is paired, the uplink and downlink resources are always available. Thus, the scheduling and the uplink control signaling fed back by the terminal are relatively in time, e.g., Acknowledge/Negative-Acknowledge (ACK/NACK) of Hybrid Automatic Retransmission reQuest (HARQ) and Channel State Information (CSI). As such, feedback delay of the air interface may be reduced, and the scheduling efficiency is increased. However, as to the TDD, the different uplink-downlink configurations lead to complex design. In addition, the TDD mode has the advantages of uplink/downlink channel reciprocity, which may greatly simplify the obtaining of the CSI.

Large-scale MIMO technique may be adopted in 5G to further increase the spectrum efficiency. The base station is equipped with a large amount of antennas. Thus, in the FDD mode, a large amount of resources may be required for downlink physical channel training and feedback of channel state information. However, the overhead of training and feedback may be greatly decreased utilizing the channel reciprocity under the TDD mode. Therefore, the TDD mode is more attractive for the large-scale MIMO technique. But 5G also has the requirement of low latency, and needs to further shorten the air interface transmission time interval (TTI) and control signaling, which makes the design of the TDD mode more complex.

It can be seen from the above analysis that, the FDD mode and the TDD mode respectively have their advantages and disadvantages. Facing the applications of rich application scenarios and new frequency band in 5G, it is necessary to design a new duplex mode, to combine the advantages of the FDD mode and the TDD mode, so as to ensure 5G spectrum utilization ratio and network performance better.

SUMMARY

The technical problem to be solved by the present disclosure is that, the FDD mode and the TDD mode in the wireless communication system operate independently and cannot be combined, which restricts the spectrum utilization ratio and the performance of the wireless communication system. To address the above-discussed deficiencies, it is a primary object to provide an in-band duplex communication method, a base station and a terminal.

A bidirectional communication method provided by the present disclosure includes: transmitting an uplink control channel and a downlink control channel respectively in a first subband and a third subband of an available un-paired spectrum, wherein control channels of reverse directions are transmitted at the same time in the first subband and third subband; and transmitting uplink data and downlink data of a data channel in a time division multiplexing manner in a second subband of the available un-paired spectrum, wherein the first subband and the third subband are on the two ends of the available un-paired spectrum.

In one embodiment, there is a guard band between the first subband and the second subband, there is another guard band between the second subband and the third subband, and no signal is transmitted in the guard bands.

In one embodiment, the size of the guard bands is determined according to an interference level of adjacent subbands and an out-of-band leakage suppression technique being used.

In one embodiment, the method further includes: adjusting, by a base station, the size of the guard bands through at least one of the following guard band modes:

inserting an additional guard band in at least one of the subbands; and adjusting a center frequency point of the data channel in at least one subframe of the second subband.

In one embodiment, the method further includes: adjusting the guard band mode dynamically according to uplink received signal strength, and indicating the currently utilized guard band mode to a terminal through a predefined manner or a broadcast channel or the downlink control channel.

In one embodiment, the method further includes: storing a relationship between the guard band mode and an index of the guard band mode in a looking-up table, and signaling the currently utilized guard band mode to the terminal through indicating the index of the currently utilized guard band mode within the looking-up table.

In one embodiment, in the guard band mode in which the additional guard band is inserted in at least one subband, parameters being adjusted comprise: position and size of the additional guard band inserted in the control channel and/or the data channel; and in the guard band mode in which the center frequency point of the data channel is adjusted, parameters being adjusted comprise: an offset of the center frequency point of the data channel.

In one embodiment, the method further includes: notifying, by the base station, the terminal of a position and a bandwidth of each subband within the available un-paired spectrum, and an uplink-downlink configuration of the data channel, and communicating with the terminal according to an appointed transmission configuration.

In one embodiment, the downlink control channel is used for transmitting downlink control signaling, wherein the downlink control signaling comprises at least one of resource allocation information, modulation and coding scheme information, hybrid automatic retransmission request acknowledgement/negative-acknowledgement information, an uplink transmission grant, an uplink transmission power control indication, the uplink control channel is used for transmitting uplink control signaling, wherein the uplink control signaling comprises at least one of a scheduling request, hybrid automatic retransmission request acknowledgement/negative-acknowledgement information, channel state information, and the second subband is used for transmitting the uplink data and the downlink data, and is further used for transmitting at least one of: a synchronization channel, a broadcast channel for transmitting system information, and an uplink random access channel.

In one embodiment, a first subframe of each radio frame is used for downlink transmission.

In one embodiment, the method further includes transmitting, by the base station, an uplink switch indication and/or a downlink switch indication in the downlink control channel, to change a transmission direction of subframes in the data channel.

In one embodiment, the method further includes transmitting at least one uplink switch indication in the downlink control channel of each radio frame, and at least one subframe in the data channel is used for uplink data communication.

In one embodiment, the method further includes inserting a guard interval at a downlink-to-uplink switching point, wherein no signal is transmitted during the guard interval.

In one embodiment, the method further includes: inserting a special subframe at the downlink-to-uplink switching point, the special subframe comprises: a downlink special slot, a guard period and an uplink pilot slot, wherein the downlink special slot is used for downlink communication, and contents transmitted by the downlink special slot comprise at least one of: a downlink data channel, a physical synchronization channel and a physical broadcast channel, the uplink pilot slot is used for conveying sounding pilot signal, and no signal is transmitted during the guard period.

In one embodiment, filtered or filter-bank single carrier modulation, or filtered or filter-bank multicarrier modulation is adopted for each subband, wherein the filtered or filter-bank single carrier or multicarrier modulation comprises any one of: Filter-Bank Multicarrier (FBMC), filtered-OFDM, and Single-Carrier Filter-Bank Multicarrier (SC-FBMC).

In one embodiment, the method further includes adjusting a frequency localization of the filter or the filter-bank to match the size of the guard bands.

In one embodiment, the method further includes dividing the second subband into at least two subbands, for different subbands, adopting different filtered or filter-bank single carrier or filtered or filter-bank multicarrier modulation physical layer parameters.

In one embodiment, the transmitting the uplink control channel and the downlink control channel respectively in the first subband and the third subband of the available un-paired spectrum comprises transmitting the downlink control channel and the uplink control channel in the first subband alternatively, and at the same time, transmitting in the third subband the control channel of a direction different from that transmitted in the first subband.

In one embodiment, a guard interval exists between transmissions of the downlink control channel and the uplink control channel in the same subband, and no signal is transmitted during the guard interval.

In one embodiment, alternating frequencies of the alternative transmission of control channels in the first subband and the third subband are the same, and are provided to the terminal via a predefined method or through the downlink control channel or through the broadcast channel in the first subframe.

In one embodiment, the method further includes transmitting, by the base station, control signaling in the data channel of the second subband, and informing the terminal whether control signaling is transmitted in the data channel of the second subband through the downlink control channel in the first subband or the broadcast channel in the second subband, wherein the base station transmits the control signaling in the data channel of the second subband via at least one of the following: transmitting signaling of the downlink control channel using partial time-frequency resources of downlink subframes in the data channel, transmitting signaling of the uplink control channel using partial time-frequency resources of uplink subframes in the data channel.

Embodiments of the present disclosure further provide a base station including a control signal transmitting module (transmitter) and a data signal transmitting module (transmitter). The control transmitting module is adapted to transmit an uplink control channel and a downlink control channel respectively in a first subband and a third subband of an available un-paired spectrum, and control channels of reverse directions are transmitted in the first subband and the third subband at the same time, the data transmitting module is adapted to transmit uplink data and downlink data of a data channel in a time division multiplexing manner in a second subband of the available un-paired spectrum. The first subband and the third subband are located at the two ends of the available un-paired spectrum.

Embodiments of the present disclosure further provide a terminal accessing method, includes implementing, by a terminal, a cell searching procedure through receiving a synchronization channel and a broadcast channel in a center position of a second subband, and obtaining system configuration information through reading the broadcast channel, wherein a time-frequency position of the synchronization channel and a time-frequency position of the broadcast channel are preconfigured in a frame structure, and the system configuration information comprises at least one of: system bandwidth, uplink-downlink configuration, guard band configuration, and control channel frequency hopping configuration, obtaining, by the terminal through the system configuration information in the broadcast channel, a center frequency point position and a bandwidth of an uplink control channel and a downlink control channel, a center frequency point and a bandwidth of a data channel, and an uplink-downlink configuration, obtaining, by the terminal through the downlink control channel, other system configuration information born by downlink subframes of a data channel, and initiating and finishing an uplink access according to the other system configuration information, communicating, by the terminal, with the base station according to an appointed uplink-downlink configuration.

In one embodiment, based on predefined looking-up table, the terminal obtains the uplink-downlink configuration, the guard band configuration and the control channel frequency hopping configuration through receiving an index from the base station respectively.

In one embodiment, the terminal determines a Hybrid Automatic Retransmission request Acknowledgement/ Negative Acknowledgement (HARQ ACK/NACK) position according to position of subframes used for uplink and downlink data communications in the data channel.

In one embodiment, the terminal determines uplink and downlink HARQ ACK/NACK positions according to a fixed HARQ Round Time Interval (RTT).

Embodiments of the present disclosure further provide a terminal, including: a cell searching module, a configuration information obtaining module, an access module and a communication module, wherein the cell searching module is adapted to implement a cell searching procedure through receiving a synchronization channel and a broadcast channel on a center frequency position of a second subband, and obtaining system configuration information through reading the broadcast channel. The time-frequency position of the synchronization channel and the time-frequency position of the broadcast channel are preconfigured in a frame structure, the system configuration information comprises at least one of: system bandwidth, uplink-downlink configuration, guard band configuration, and control channel frequency hopping configuration, the configuration information obtaining module is adapted to obtain center frequency points and bandwidths of an uplink control channel and a downlink control channel, a center frequency point and a bandwidth of a data channel, and uplink-downlink configuration according to the system configuration information in the broadcast channel, the access module is adapted to obtain other system configuration information born by downlink subframes of a data channel via the downlink control channel, and initiate and finish an uplink access according to the other system configuration information, and the communication module (transceiver) is adapted to communicate with the base station according to an appointed uplink-downlink configuration.

In the bidirectional communication method and device provided by embodiments of the present disclosure, the uplink control channel and the downlink control channel are respectively transmitted in the first subband and the third subband of the available un-paired spectrum, wherein control channels of reverse directions are transmitted in the first subband and the third subband at the same time; and uplink data and downlink data are transmitted in a time division multiplexing mode in the second subband of the available un-paired spectrum. It is not required to allocate multiple bands. The un-paired spectrum may be directly divided into subbands. Interferences between the subbands are restrained utilizing out-of-band leakage suppressing technique and the guard bands. The spectrum utilization ratio and performance of the wireless communication system are improved.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" or "processor" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 19, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged telecommunication devices.

The present disclosure will be described in further detail hereinafter with reference to accompanying drawings and embodiments to make the objective, technical solution and merits therein clearer.

Figure 1:
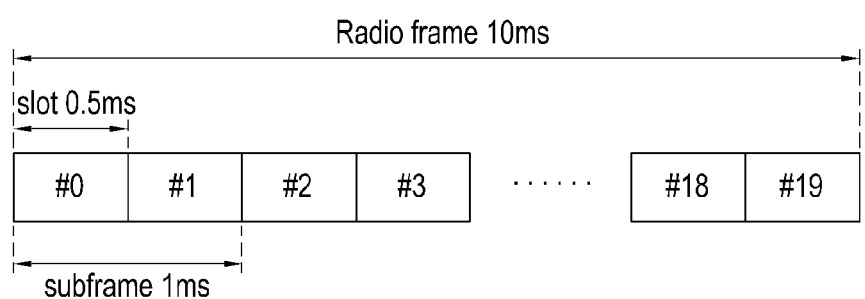
FIG. 1 is a schematic diagram illustrating an LTE FDD frame structure according to the prior art.
Figure 2:
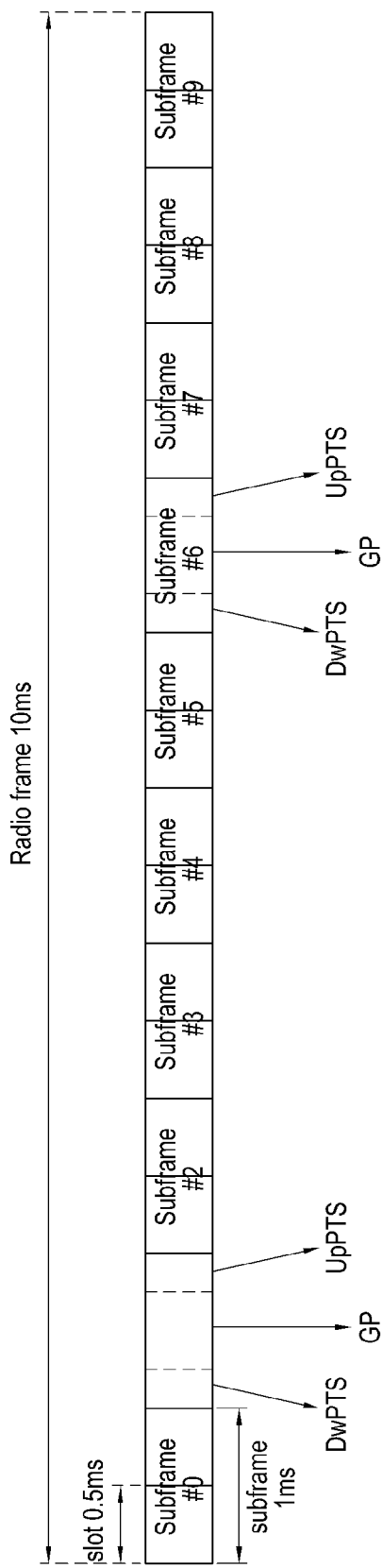
FIG. 2 is a schematic diagram illustrating an LTE TDD frame structure according to the prior art.
Figure 3:
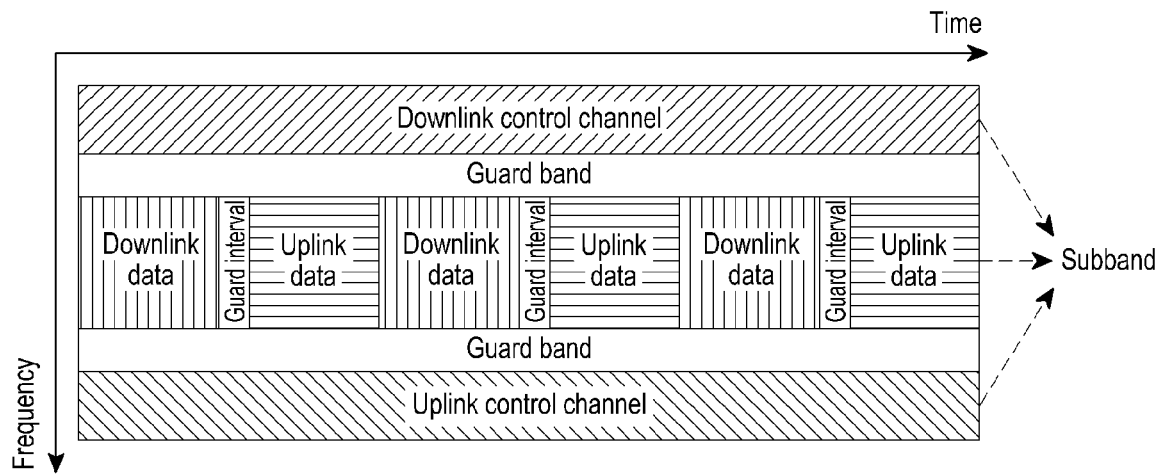
FIG. 3 is a schematic diagram illustrating an in-band hybrid duplex mode according to some embodiments of the present disclosure.

The present disclosure provides an in-band bidirectional communication method with separated control and data, shortened as In-band Hybrid Duplex hereinafter. "In-band" means that the present disclosure does not require multiple bands. An un-paired spectrum can be directly divided into subbands. Interferences between different subbands can be reduced by out-of-band leakage suppressing technique (such as filtered waveform modulation technique) and guard bands. FIG. 3 is a schematic diagram showing the in-band hybrid duplex solution provided by some embodiments of the present disclosure.

In FIG. 3, the time-frequency resources used for data transmission are divided into three parts in the frequency domain. The two subbands on the two ends are respectively used for transmitting an uplink control channel and a downlink control channel. The subband in the middle is used for transmitting a data channel (also referred to as a "data subband" hereinafter). In order to avoid interferences between the control channels and the data channel, guard bands are inserted between the subbands. The control channels and the data channel are transmitted using a manner similar as FDD. But the data channel is transmitted using a manner similar as TDD, i.e., uplink data and downlink data share the same frequency band and are differentiated by time. A guard interval is inserted at the downlink-to-uplink switching point, acting as a switching guard period from the downlink to the uplink, so as to avoid interferences to uplink receiving caused by the time multiplexing downlink transmission.

In order to reduce spectrum utilization ratio loss due to the guard bands, the present disclosure adopts "filtered or filter-bank single carrier" or "filtered or filter-band multicarrier modulation", including but is not limited to Filter-Bank Multicarrier (FBMC) technique (reference document: "Analysis and design of OFDM/OQAM systems based on filter bank theory", IEEE Transactions on Signal Processing, Vol. 50, No. 5, 2002), Filtered-OFDM (F-OFDM) technique (reference document "The effect of filtering on the performance of OFDM systems," IEEE Trans. Veh. Tech., vol. 49, no. 5, pp. 1877-1884, 2000.), Single-Carrier Filter-Bank Multicarrier (SC-FBMC) technique, etc. A common objective of these techniques is to filter signals based on filters, so as to restrain out-of-bank leakage, i.e., reducing the interferences between the subbands. Thus, the size of the guard bands can be adjusted according to implementations of the filters. The filtered or filter-bank single carrier or filtered or filter-bank multicarrier modulation includes filtered single carrier modulation, filtered multicarrier modulation, filter-bank single carrier modulation and filter-bank multicarrier modulation.

FBMC can achieve waveform with proper time/frequency localization by adopting well-designed prototype filter function, e.g., based on prototype filter functions such as Isotropic Orthogonal Transform Algorithm (IOTA), or Extended Gaussian Function, or European PHYDYAS. FBMC performs pulse shaping to signals of each subcarrier utilizing filters with better time/frequency localization, such that: FBMC is able to restrain ISI caused by multipath without the need of CP, which brings higher spectrum efficiency and energy efficiency compared to OFDM, and has a better receiving robustness under larger time error at the same time, therefore a non-rigid synchronized transmission is allowed; benefit from better frequency localization, FBMC is able to transmit signals within extremely narrow frequency resources and remain very low out-of-band leakage. Such that, Inter-Carrier Interferences (ICI) brought out by Doppler or phase noise can be restrained better. Therefore, FBMC requires a narrow guard band for implementing the in-band hybrid duplex, and the saved cyclic prefix offload can compensate for the offload of the guard bands to some extent. Therefore, the in-band hybrid duplex mode as shown in FIG. 3 is competitive in 5G from the view of spectrum utilization ratio.

Figure 4:
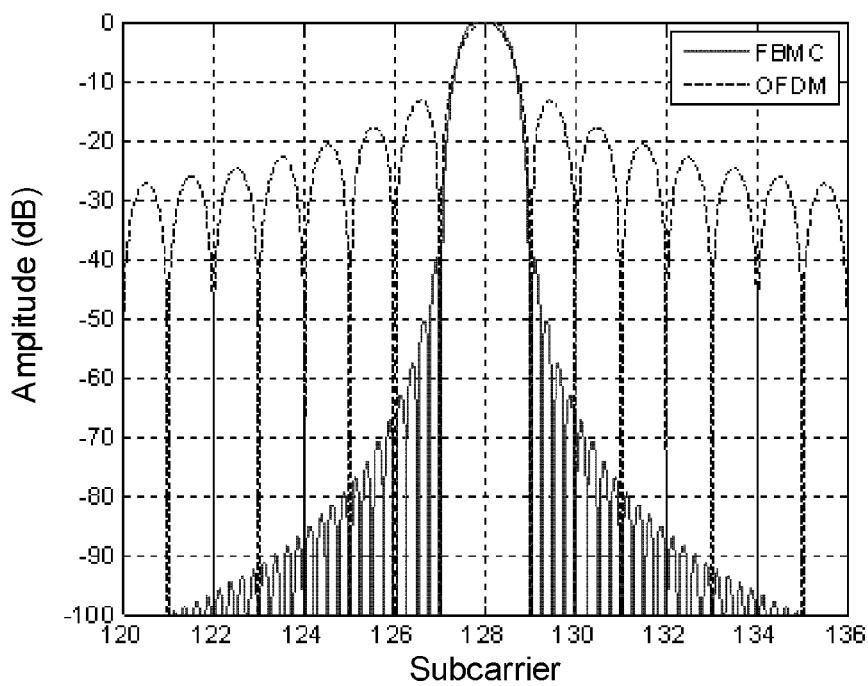
FIG. 4 is a schematic diagram illustrating comparison of waveforms of FBMC subcarriers and OFDM subcarriers according to some embodiments of the present disclosure.

FIG. 4 is a schematic diagram showing subcarrier frequency-domain waveform of FBMC with PHYDYAS filter and that of the OFDM technique with rectangle window function. It can be seen that, compared with the OFDM technique, FMBC has better frequency localization, fast frequency-domain waveform fading and little out-of-band leakage. Therefore, FBMC is very suitable for the in-band hybrid duplex mode as shown in FIG. 3. It can effectively reduce adjacent channel interferences, while effectively reducing the bandwidth occupied by the guard bands and decreasing the offload caused by the guard bands.

Figure 5:
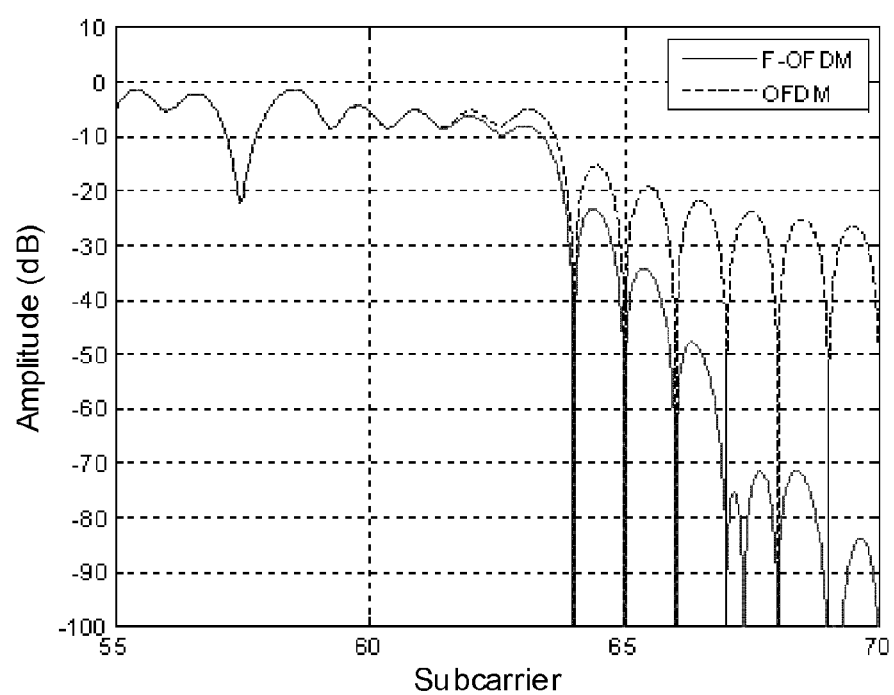
FIG. 5 is a schematic diagram illustrating comparison of spectrums of F-OFDM and OFDM according to some embodiments of the present disclosure.

FIG. 5 is a schematic diagram showing comparison of spectrums of F-OFDM and OFDM with 64 valid subcarriers. The filter adopted by the F-OFDM technique is obtained by multiplying a sinc function and a hanning window. It can be seen that, compared with the OFDM technique, the out-of-band spectrum fading of the F-OFDM technique is apparently faster. The out-of-band leakage behind several subcarriers out of the band is decreased to a relatively low level. Therefore it can reduce the spectrum efficiency loss caused by the guard bands. A well-designed filter can let the F-OFDM have a faster out-of-band fading, but a tradeoff has to be made between the complexity and signal distortion index.

The in-band hybrid duplex mode as shown in FIG. 3 has the following technical advantages:

1. Paired spectrums are not required and resource scheduling and uplink-downlink communication configuration are more flexible. Thus, large un-paired bandwidth can be allocated in the new band of 5G, and spectrum fragments are avoided.

2. The uplink and downlink control channels are transmitted over the whole band. Therefore, the HARQ timing sequence similar to the FDD mode can be adopted, which avoids HARQ timing sequence confusion and the low efficiency of the TDD mode.

3. Through enhancement of Sounding Reference Signal (SRS) in the data subband, downlink channel estimation can be implemented through channel reciprocity based on the channel estimation of the uplink channel. This characteristic effectively reduces the offload for channel training and feedback in large-scale MIMO system, and is very suitable for the high band communication and large-scale MIMO technique in 5G wireless communications.

In order to support the in-band hybrid duplex mode, the terminal has to have the capability for simultaneously processing signals of different subbands. Considering that current mobile communication equipment generally supports both the FDD mode and the TDD mode, they have the capability for processing signals of different subbands and therefore are able to support the in-band hybrid duplex mode provided by the present disclosure. In addition, when the in-band hybrid duplex mode is adopted, based on the FBMC modulation, asynchronous transmission and license exempt small packet data transmission are still able to be implemented in the data subband in the TDD mode.

Hereinafter, the technical solution of the present disclosure is described in further detail with reference to some embodiments.

Figure 6:
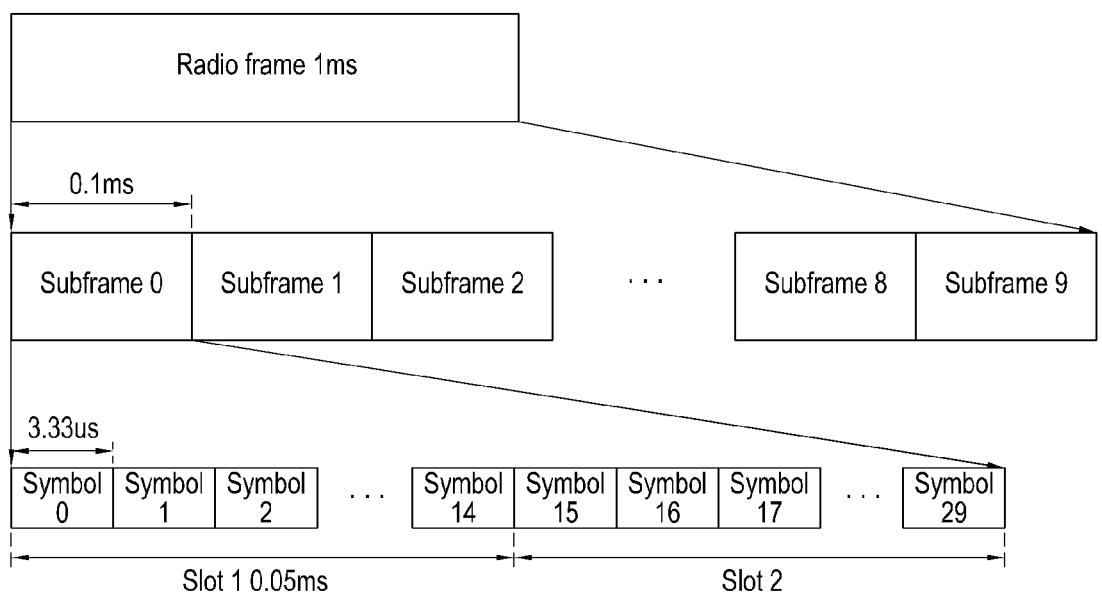
FIG. 6 is a schematic diagram illustrating a frame structure according to some embodiments of the present disclosure.

Embodiment 1:

In this embodiment, a communication system based on the in-band hybrid duplex mode is described with reference to detailed system parameter configurations. In this embodiment, suppose that the application scenario is a high frequency communication scenario in 5G, e.g. a communication system operating on millimeter band. In order to increase system spectrum utilization ratio and reduce out-of-band leakage, a new waveform multicarrier modulation scheme such as FBMC or F-OFDM which has little out-of-band leakage and fast out-of-band fading is adopted. Suppose that the system operates on 28 GHz, the system bandwidth is 150 MHz, and subcarrier interval is 300 kHz. At this time, the duration of one multicarrier symbol is 3.33 us, the multicarrier modulation uses a 512-point Fast Fourier Transform (FFT). The radio frame structure follows that in the LTE, i.e., a radio frame consists of subframes and a subframe consists of slots. In this embodiment, one slot consists of 15 multicarrier modulation symbols of 0.05 ms length. One subframe consists of two slots of 0.1 ms length. One radio frame consists of ten 1 ms subframes. The frame structure described in this embodiment is shown in FIG. 6. The symbols in FIG. 6 refer to multicarrier modulation symbols. It should be noted that, this embodiment adopts the new waveform modulation technique FBMC, which is able to restrain Inter-Symbol Interference (ISI) caused by multipath channel without adding Cyclic Prefix (CP).

Figure 7:
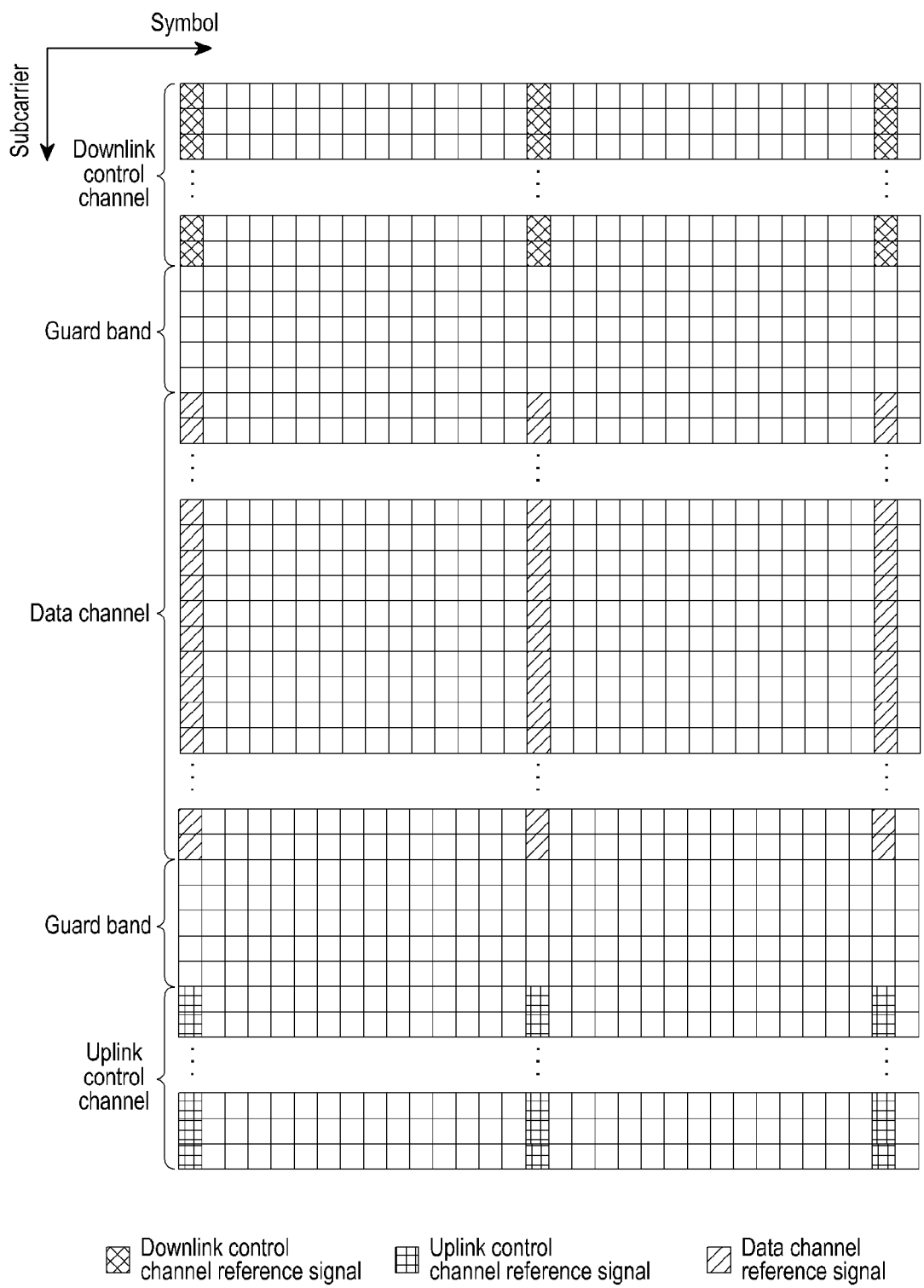
FIG. 7 is a schematic diagram illustrating a duplex frequency band division according to some embodiments of the present disclosure.

FIG. 7 is a schematic diagram illustrating a spectrum structure provided by some embodiments of the present disclosure. One subcarrier in one multicarrier symbol is defined as a Resource Element (RE). One resource block includes 20 subcarriers of 15 multicarrier symbols, i.e., 300 REs, representing a bandwidth of 5 MHz and a length of 0.05 ms. The spectrum structure as shown in FIG. 7 occupies 150 MHz bandwidth and includes 500 available subcarriers.

As shown in FIG. 7, the available bandwidth can be divided into four parts according to their functions, including an uplink control channel, a downlink control channel, a data channel and guard bands. The 15 subcarriers on the two ends of the bandwidth are respectively used for transmitting the uplink control channel and the downlink control channel. The 460 subcarriers in the middle of the bandwidth are used for data transmission. The 5 subcarriers between the control channel and the data channel are reserved as the guard band, so as to reduce the interference between the control channel and the data channel. It is known from FIG. 4 that the out-of-band leakage behind the 5 subcarriers can roll off to below 100 dB.

Considering that the new waveform modulation scheme is adopted, the out-of-band leakage is greatly decreased compared to the OFDM technique. Therefore, a relatively narrower bandwidth is required to be reserved as the guard band to effectively reduce or even eliminate the interference between the data channel and the control channel. The size of the guard band is relevant to the out-of-band suppression capability of the new waveform modulation scheme, i.e., the frequency localization of the filter can be adjusted to match the size of the guard band. In this embodiment, 5 subcarriers are respectively reserved between the data channel and the downlink control channel and between the data channel and the uplink control channel as the guard bands. Each guard band occupies 1.5 MHz bandwidth. For the new waveform modulation techniques such as FBMC with low out-of-band leakage, it is enough to eliminate the inter-channel interference caused by the out-of-band leakage. The two 1.5 MHz guard bands occupy merely 2% of the whole bandwidth. Compared with the 10% guard band reservation in the current LTE OFDM system for treating spectrum leakage and the exceeding 6% CP overhead, the overhead of the guard bands can be almost ignored.

Functions of each channel as shown in FIG. 7 are as follows.

The downlink control channel is used for transmitting downlink control signaling, including resource allocation information, Modulation and Coding Scheme (MCS) of each code word, HARQ information, number of layers information in case of multi-layer transmission, power control signaling of the uplink control channel, trigger of non-periodic SRS transmission, etc. At the same time, the downlink control channel is also used for transmitting HARQ indication information. That is to say, the downlink control channel includes at least a PDCCH and a PHICH similar as the LTE.

The uplink control channel is used for transmitting uplink control signaling, including: Scheduling Request (SR), HARQ ACK/NACK information, Channel State Information (CSI), etc. The CSI includes Channel Quality Indicator (CQI), and Rank Indicator (RI) and Precoding Matrix Indicator (PMI) used for MIMO transmission feedback. That is to say, the uplink control channel includes at least a PUCCH similar as the LTE.

Figure 8:
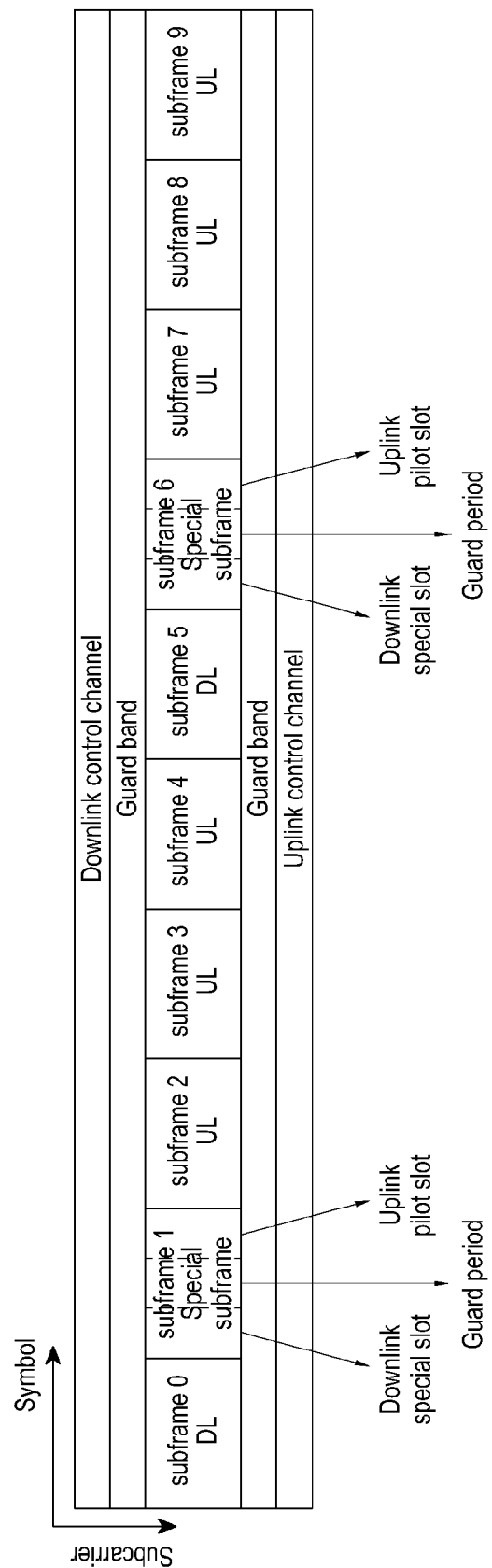
FIG. 8 is a schematic diagram illustrating a data communication structure according to some embodiments of the present disclosure.

The data channel is used for transmitting uplink and downlink data, and also a synchronization channel, a broadcast channel used for transmitting system information and an uplink random access channel. In other words, it includes at least a PUSCH, a PDSCH, a PRACH, a PBCH and an SCH similar as the LTE. Since the data channel is used for data communications of both the uplink and the downlink simultaneously and the uplink data and the downlink data are differentiated via time, it is required to insert a guard interval at the downlink-to-uplink switching point, so as to provide a switch guard period and avoid serious interference of the downlink communication to the uplink communication. Similarly to the LTE TDD frame structure, a special subframe can be inserted at the downlink-to-uplink switching point, for providing a guard period at the downlink-to-uplink switching point. FIG. 8 shows a data frame structure according to some embodiments of the present disclosure. As shown in FIG. 8, the special subframe includes three parts, respectively are a downlink special slot, a guard period and an uplink pilot slot. The downlink special slot is used for downlink communication, and contents transmitted by this slot can include any one or any combination of: a downlink data channel, a physical synchronization channel, and a physical broadcast channel. The uplink pilot slot is used for conveying sounding reference signal. The guard period does not transmit any signal and is used for providing the time required for switching from the downlink to the uplink and avoiding interference of the downlink transmission to the uplink receiving. Take the FBMC as an example, considering that its time-domain tail is relatively long, it is required to provide a relatively long guard period to ensure that the downlink data does not generate interfere to the uplink communication. For example, the FBMC technique with an overlap factor 4 can require a guard period longer than 4 multicarrier symbols. If a multicarrier modulation technique with a relative short time-domain tail is adopted, the guard period can be shorter.

In the in-band hybrid duplex mode provided by the embodiments of the present disclosure, the proportion of the uplink and downlink data can be adjusted according to requirements of downlink and uplink services. For example, it can be adjusted according to the uplink-downlink subframe proportions as shown in Table 1, wherein the Physical Broadcast Channel (PBCH) is fixedly transmitted in subframe 0, indicating the uplink-downlink configuration used by the radio frame. Therefore, the in-band hybrid duplex mode is able to meet the requirements of various asymmetric services and has a high flexibility.

Reference signal is required to be inserted in both the data channel and the control channels, used for demodulation of the data transmitted in respective channels. In the example as shown in FIG. 7, the reference signal is transmitted in the first symbol of each resource block. The channel state information of other symbols can be obtained via an interpolation method. Besides the solution as shown in FIG. 7, a discrete interpolation method of the reference signal similar to the LTE can also be adopted. At this time, channel estimation of multiple time-frequency points can be obtained through inserting reference signals in non-consecutive symbols and subcarriers.

In addition, considering that the control channels and the data channel have different accuracy requirements as to the channel estimation, the inserting frequency of the reference signal in the control channels and the data channel can also be different. For example, compared with the data channel, the control channels require a higher accuracy and therefore have a higher accuracy requirement for the channel estimation. As to the control channels, the inserting frequency of the reference signal can be increased to some extent, so as to ensure the accuracy of the channel estimation of the control channels. At the same time, the inserting frequency of the reference signal in the data channel can be decreased to some extent to obtain higher spectrum efficiency.

Through the reference signal transmitted in the uplink data subframe and the uplink pilot slot in the special subframe, the base station is able to know the channel state information of the uplink channel. According to channel reciprocity, the base station can deduce the downlink channel state information according to the uplink channel state information and implement operations such as precoding based on the downlink channel state information. The reference signal in the downlink data channel is used for estimating an equivalent channel after the precoding, which is similar to the demodulation reference signal in the LTE. Since channel reciprocity of the uplink and downlink channels can be utilized in the in-band hybrid duplex mode, the downlink physical channel estimation and the channel state information feedback in the large-scale MIMO technique are greatly simplified, which is good for implementations of the large-scale MIMO technique and the high frequency band technique in 5G.

In addition, the structure as shown in FIG. 6 is applicable for modulation schemes which do not require adding CP, e.g., FBMC modulation scheme, etc. For modulation schemes which requires CP to reduce Inter-symbol interference, e.g., F-OFDM technique, the structure as shown in FIG. 6 needs a slight modification, e.g., after CP is added to each symbol, the lengths of slot, subframe and radio frame are all changed, whereas the length of the CP is subject to the utilized waveform and factors such as the multipath delay to be restrained. It should be noted that, the frame structure, especially whether CP is added to the multicarrier symbol does not affect the implementation of the solution provided by embodiments of the present disclosure. In the subsequent description, the frame structure as shown in FIG. 6 is still used as an example. The bandwidth occupied by each channel can be adjusted according to a practical application scenario. For example, considering that the downlink control channel needs to transmit more signaling compared to the uplink control channel, more bandwidth resources can be allocated to the downlink control channel and the bandwidth allocated to the uplink control channel can be reduced at the same time.

Embodiment 2

Figure 9:
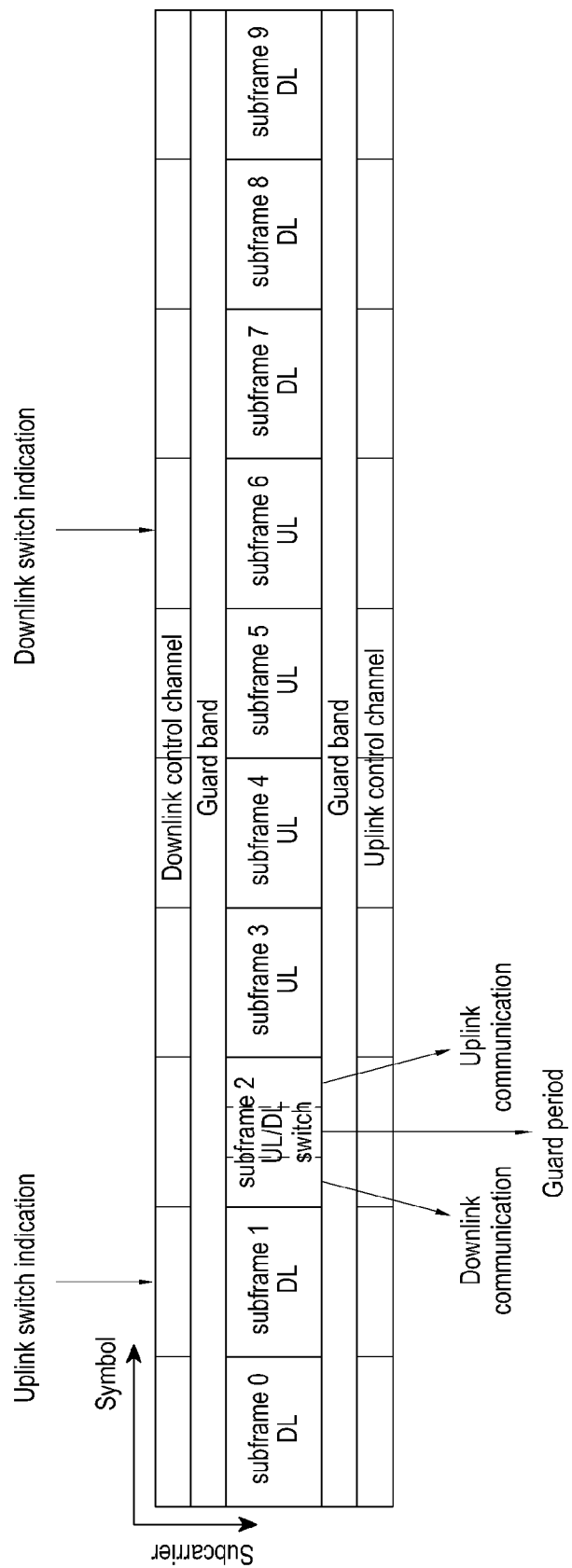
FIG. 9 is a schematic diagram illustrating flexible uplink-downlink configurations according to some embodiments of the present disclosure.

In this embodiment, parameters such as the system frame structure and spectrum structure follow those in embodiment 1. The difference relies in that, in embodiment 1, the terminal obtains cell-specific uplink-downlink configuration of the data channel via broadcast message. In this embodiment, in order to make the uplink-downlink configuration more flexible, the uplink-downlink configuration of subframes can be indicated in the downlink control channel. For example, in one possible method, subframe 0 of each radio frame is used for downlink communication; when it is required to switch to uplink communication, an uplink switch indication is transmitted in the downlink control channel of a subframe before the switch; during the uplink communication, if it is required to switch to downlink communication, a downlink switch indication can be transmitted in the downlink control channel in a subframe before the switch. FIG. 9 is a schematic diagram illustrating the flexible uplink-downlink configuration according to the above manner.

In FIG. 9, subframe 0 is used for downlink communication. The base station inserts an uplink switch indication in the downlink control channel of subframe 1, notifying the terminal that the next subframe, i.e., subframe 2 is used for uplink-downlink switch. The structure of subframe 2 is similar to the special subframe as shown in FIG. 8, including downlink communication, guard period and uplink communication three parts. The guard period is used for providing protection when the downlink communication is switched to uplink communication. The detailed structure of subframe 2 can be further indicated in the downlink control channel. Subframes 3, 4, 5 and 6 are all used for uplink communication. The base station inserts a downlink switch indication in the downlink control channel of subframe 6, indicating that the next subframe of the current subframe, i.e., subframe 7 is switched to downlink communication.

Although the uplink-downlink configuration indicating method as shown in FIG. 9 introduces a certain amount of signaling overhead (uplink/downlink switch indication needs to be inserted in the downlink control channel), compared with the LTE TDD mode, the uplink-downlink configuration is more flexible. The base station is able to flexibly adjust the uplink-downlink configuration according to uplink and downlink data communication requirements.

In order to utilize the channel reciprocity of the TDD mode, it is necessary to ensure that at least one subframe in each radio frame is used for uplink transmission. It can be defined that at least one uplink switch indication needs to be transmitted in the downlink control signaling and ensure that there is one complete subframe used for uplink communication.

Embodiment 3

This embodiment provides an example of the flexible configuration of the guard bands. Parameters such as the system frame structure and the spectrum structure follow those in embodiment 1. In embodiment 1, the guard bands of the same size are utilized between the data channel and the control channels, which is relatively simple and suitable for low power small cell scenarios. Considering that the downlink communication transmission power is generally high in most cases, whereas the uplink communication receiving power is relatively low, the downlink transmission (including the data channel and the control channel) will generate large interference to the uplink receiving. But the uplink transmission has relatively little interference to the downlink receiving. Although it is simple to use the guard bands of the fixed size between subbands to prevent leakage interference between the subbands, as to the interference of uplink transmission to downlink receiving, too much reservation results in waste, but too little reservation is not enough for restraining the adjacent band leakage interference of the downlink transmission to the uplink receiving. Therefore, it is provided in this embodiment that, as to the guard bands configured in advance, the size of the guard bands can be adjusted according to the situation of the interference.

Figure 10:
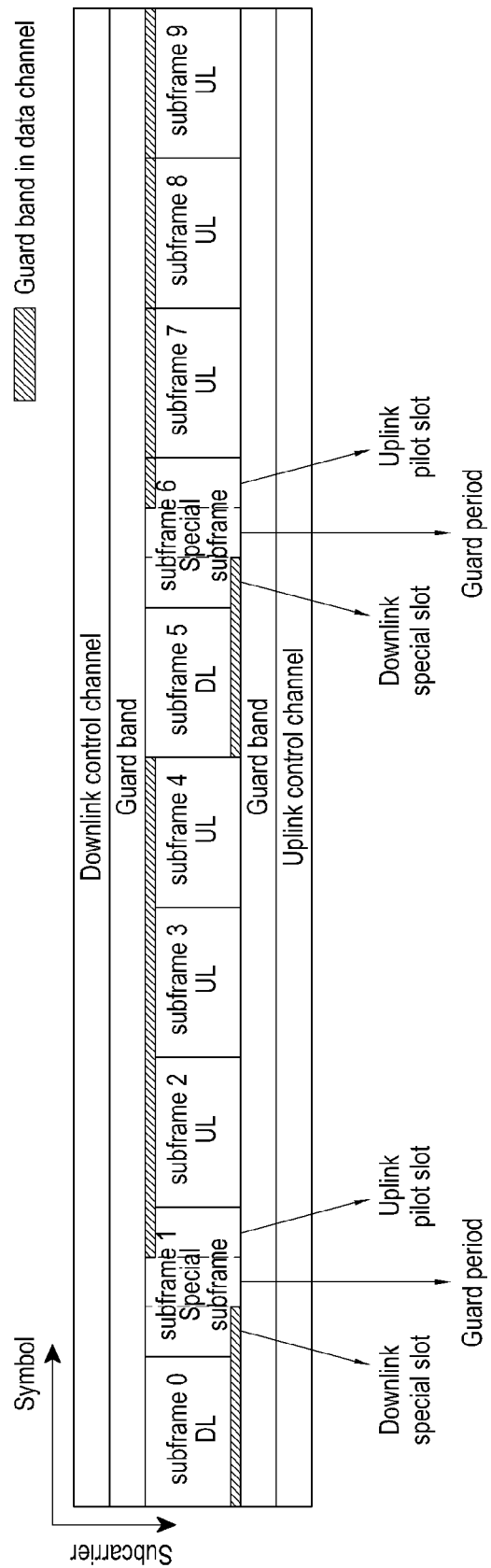
FIG. 10 is a schematic diagram illustrating an in-band hybrid duplex mode in which guard bands are inserted in the data channel according to some embodiments of the present disclosure.

FIG. 10 is a schematic diagram illustrating the in-band hybrid duplex mode in which guard bands are inserted in the data channel according to some embodiments of the present disclosure. As shown in FIG. 10, subframe 0 and a downlink special slot in a subsequent special subframe are used for downlink communication and will generate interference to the uplink control channel in the adjacent band. Through reserving a part of the data channel which is adjacent to the uplink control channel as the guard band, the guard band between the downlink data communication and the uplink control channel is enlarged, which enhances the protection to the uplink control channel. For example, during the transmission of subframe 0 and the downlink special slot of subframe 1, five subcarriers adjacent to the uplink control channel are reserved as the guard band in the data channel and no data is transmitted on these subcarriers. Thus, compared to the structure as shown in FIG. 8, the guard band between the downlink data communication and the uplink control channel is enlarged to 10 subcarriers, i.e., 3 MHz, which is able to provide a better protection to the uplink control channel.

Similarly, the uplink pilot slot in subframe 1 and the subsequent subframes 2, 3 and 4 are used for uplink transmission and will be interfered by the downlink control channel of the adjacent band. In order to reduce the interference, some carriers in the uplink pilot slot of subframe 1 and the subframes 2, 3 and 4 adjacent to the downlink control channel are reserved as the guard band. For example, five subcarriers are reserved and no data is transmitted on these subcarriers. Thus, the guard band between the downlink control channel and the uplink communication is enlarged to 3 MHz, which can provide a better protection to the uplink data communication.

Figure 11:
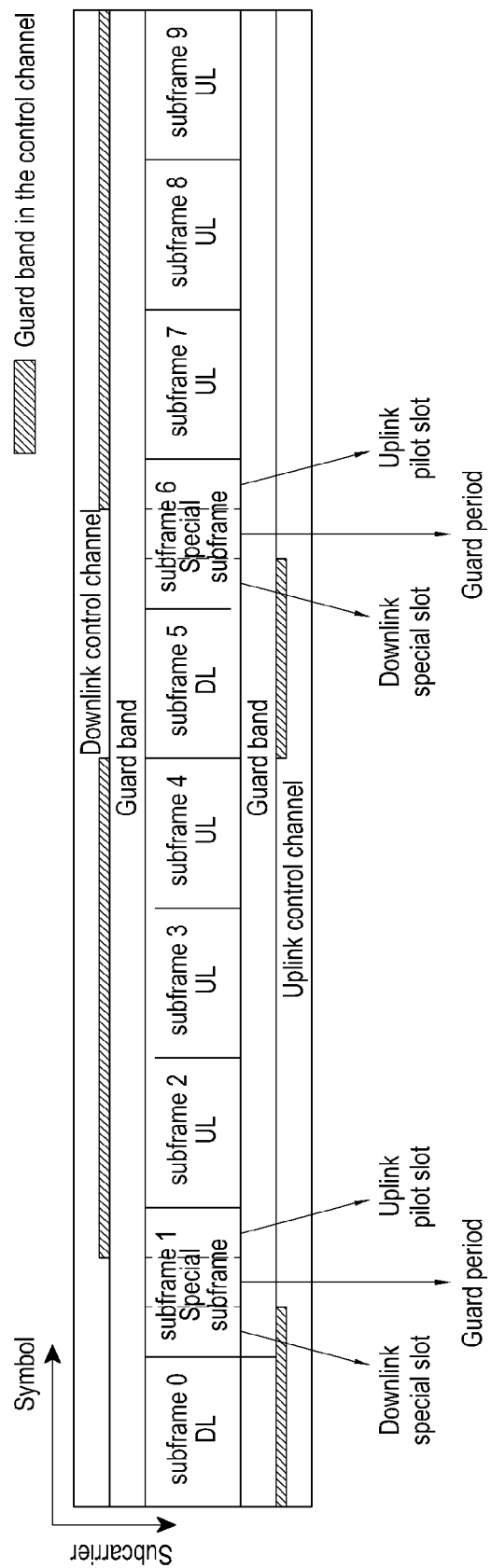
FIG. 11 is a schematic diagram illustrating an in-band hybrid duplex mode in which the guard bands are inserted in the control channels according to some embodiments of the present disclosure.

Although the above manner of inserting additional guard band in the data channel can reduce the interference of the downlink communication to the uplink, it also reduces effective data band and thus decreases the data transmission ratio. FIG. 11 is a schematic diagram illustrating an in-band hybrid duplex mode in which guard bands are inserted in the control channel according to some embodiments of the present disclosure. As shown in FIG. 11, through inserting additional guard bands in the control channel, the guard bands between the downlink communication and the uplink communication can be enlarged and the protection to the uplink communication is enhanced.

Besides the additional guard band insertion manners as shown in FIGS. 10 and 11, a combination of the two manners can be adopted to extend the guard bands, i.e., a part of the additional guard band is inserted in the data channel, and the other part is inserted in the control channel.

Figure 12:
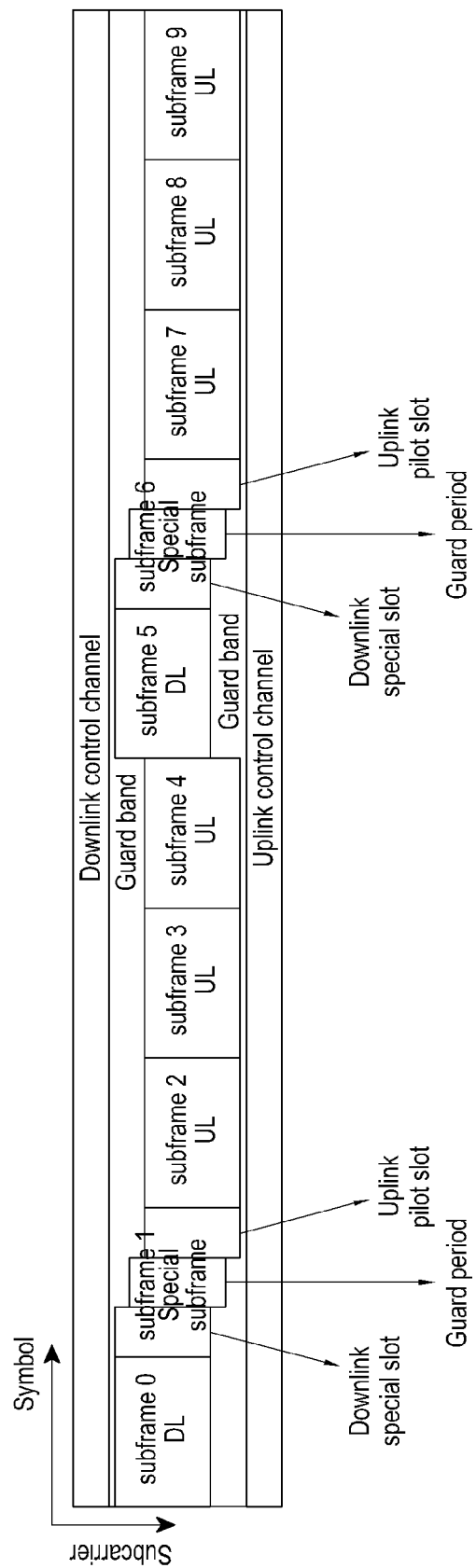
FIG. 12 is a schematic diagram illustrating an in-band hybrid duplex mode in which data channel center frequency point is adjusted according to some embodiments of the present disclosure.

Besides the method of inserting additional guard band in the data channel or the control channel, it is also possible to move the center frequency point of the data channel of some subframes to adjust the guard band. For example, FIG. 12 is a schematic diagram illustrating a guard band adjusting manner through adjusting the center frequency point of the data channel according to some embodiments of the present disclosure. Through moving the center frequency point of the subframes used for downlink communication (subframes 0 and 5) and the downlink special slot used for downlink communication in the special subframe, the guard band can be closer to the downlink control channel. At this time, the guard band between the subframes used for downlink communication in the data channel and the uplink control channel is enlarged. Therefore, better protection can be provided to the uplink control channel. At the same time, although the guard band between the subframes used for downlink communication in the data channel and the downlink control channel is narrowed, since the interference between them is not serious, the system performance is not seriously affected. Similarly, through moving center frequency point of the subframes (subframes 2, 3, 4, 7, 8, 9) used for uplink communication and the uplink pilot slot in the special subframe towards the uplink control channel, the guard band between the downlink control channel and the subframes used for uplink communication in the data channel is enlarged. Thus, better protection can be provided for the uplink data communication.

The adjusting of the guard band through moving the center frequency point of the data channel ensures that the data rate is not affected. For example, the subframes used for downlink communication in the data channel are moved 3 subcarriers towards the downlink control channel. At this time, the guard band between the subframes used for downlink communication in the data channel and the uplink control channel is extended to 2.4 MHz, whereas the total guard band is still 3 MHz. The overhead brought out by the guard band is not changed, but the protection to the uplink control channel is enhanced.

The mode of the guard band (the inserted position and the size of the guard band or the offset of the data channel center frequency point) can be stored in the base station and the terminal in form of a looking-up table. The base station transmits the guard band mode in subframe 0 via the broadcast channel or downlink control channel. The terminal determines the bandwidth and position of the control channels and the data channel through receiving the guard band mode via the broadcast channel or the downlink control channel. It is also possible to determine a fixed base guard band size and an additional guard band size through a predefined method. The terminal implicitly obtains the bandwidth of the data channel according to the uplink-downlink configuration situation of the data channel and the adjacent band situation of the control channel. For example, as to the uplink-downlink configuration shown in FIG. 10, the terminal determines through a predefined rule that the data channel needs to take out 5 subcarriers in subframe 3 adjacent to the subband of the downlink control channel, whereas the base guard band is utilized adjacent to the uplink control channel.

Since the guard bands are mainly used for preventing the uplink receiving signal from being interfered by the downlink transmission signal, the base station can also determine the size of the guard bands through measuring the uplink received signal strength and the downlink communication out-of-band leakage. The uplink received signal strength is mainly subjected to cell size and the distance between the terminal and the base station. Therefore, during the movement of the terminal, the size of the guard bands can be dynamically adjusted to be suitable for the variation of the channel. In particular, the base station can determine the size of the guard bands according to the uplink signal receiving situation and indicate it to the terminal via the broadcast channel or the downlink control channel. According to corresponding indication, the terminal obtains the bandwidth of the uplink and downlink control channels, the bandwidth and the center frequency point of the data channel.

Embodiment 4

This embodiment provides an example for increasing channel reliability in an in-band duplex communication system with separated control and data. The system frame structure and the spectrum structure are the same as those in embodiment 1. Transmission of the control channel using the one frequency band is unfavorable for transmission conditions with high frequency selective fading. In order to increase the transmission reliability of the control channel, this embodiment transmits control signaling in a frequency hopping manner to provide frequency diversity gain for the control channel.

Figure 13:
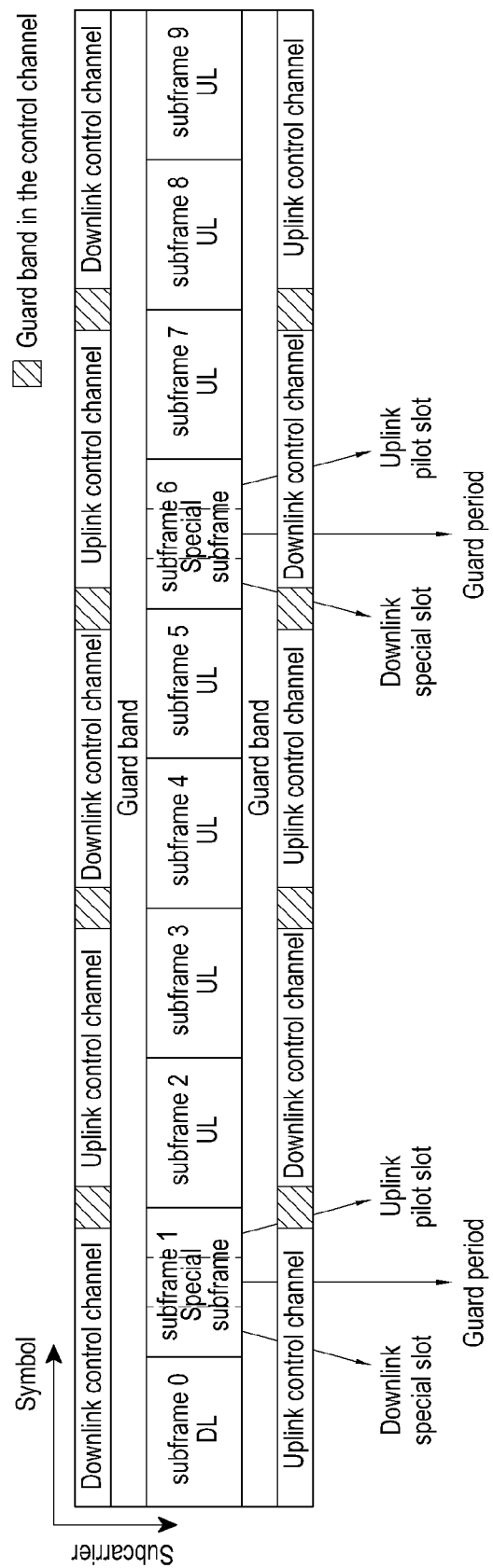
FIG. 13 is a schematic diagram illustrating a frequency hopping transmission manner of the control channel according to some embodiments of the present disclosure.

One frequency hopping transmission method of the control signaling is as shown in FIG. 13. It can be seen that, uplink and downlink control channel transmissions are switched each two subframes (0.2 ms), and a guard interval is inserted at the downlink-to-uplink switching point. The switch can ensure that the uplink control channel experiences different frequency bands, so as to provide frequency diversity for the control channel and increase the fading resistance capability of the control channel.

It should be noted that, in the above frequency hopping transmission manner of the control signaling, the guard interval at the downlink-to-uplink switching point can be configured flexibly. The frequency hopping manner of the control channels can be defined in advance, or the base station can indicate the frequency hopping manner in the broadcast channel or the downlink control channel in subframe 0 and the terminal acquires the position of the uplink and downlink control channels according to this indication.

Figure 14:
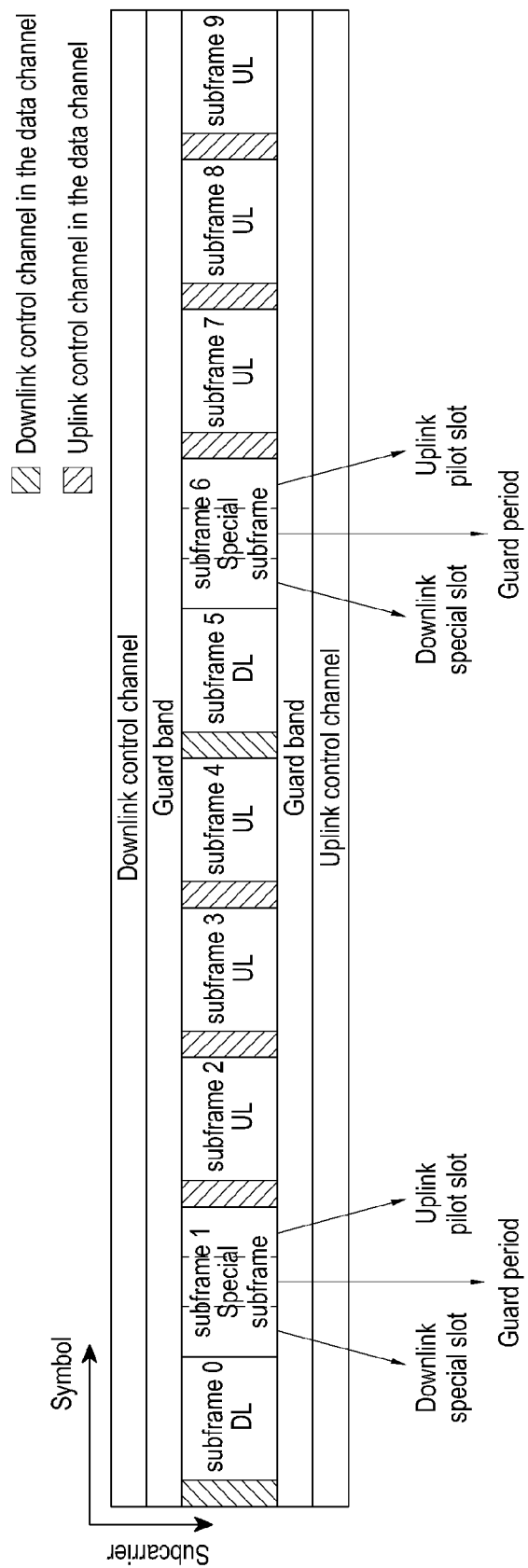
FIG. 14 is a schematic diagram illustrating transmission of control signaling in the data channel according to some embodiments of the present disclosure.

FIG. 14 shows another manner for providing frequency diversity for the control channels according to some embodiments of the present disclosure, i.e., transmitting control signaling in the data channel. In FIG. 14, the control signaling in the data channel is transmitted in first several multicarrier modulation symbols of each subframe. Besides the manner as shown in FIG. 14, the control signaling in the data channel can also be transmitted on several consecutive subcarriers in the middle. In addition, the downlink special slot in the special subframe can also be used for transmitting the downlink control signaling.

The control signaling in the data channel can repeat the control data of the control channel in corresponding subframes, or can carry additional control signaling about the subframe where the control signaling is located.

The two solutions as shown in FIGS. 13 and 14 can be combined, i.e., using the frequency hopping of the control channel as well as inserting control signaling in the data channel, so as to provide more reliable protection for the transmission of the uplink and downlink control signaling.

Embodiment 5

This embodiment describes HARQ timing sequence and processing manner in the in-band hybrid duplex mode provided by the present disclosure. In this embodiment, the system frame structure and the spectrum structure are the same as those in embodiment 1.

Figure 15:
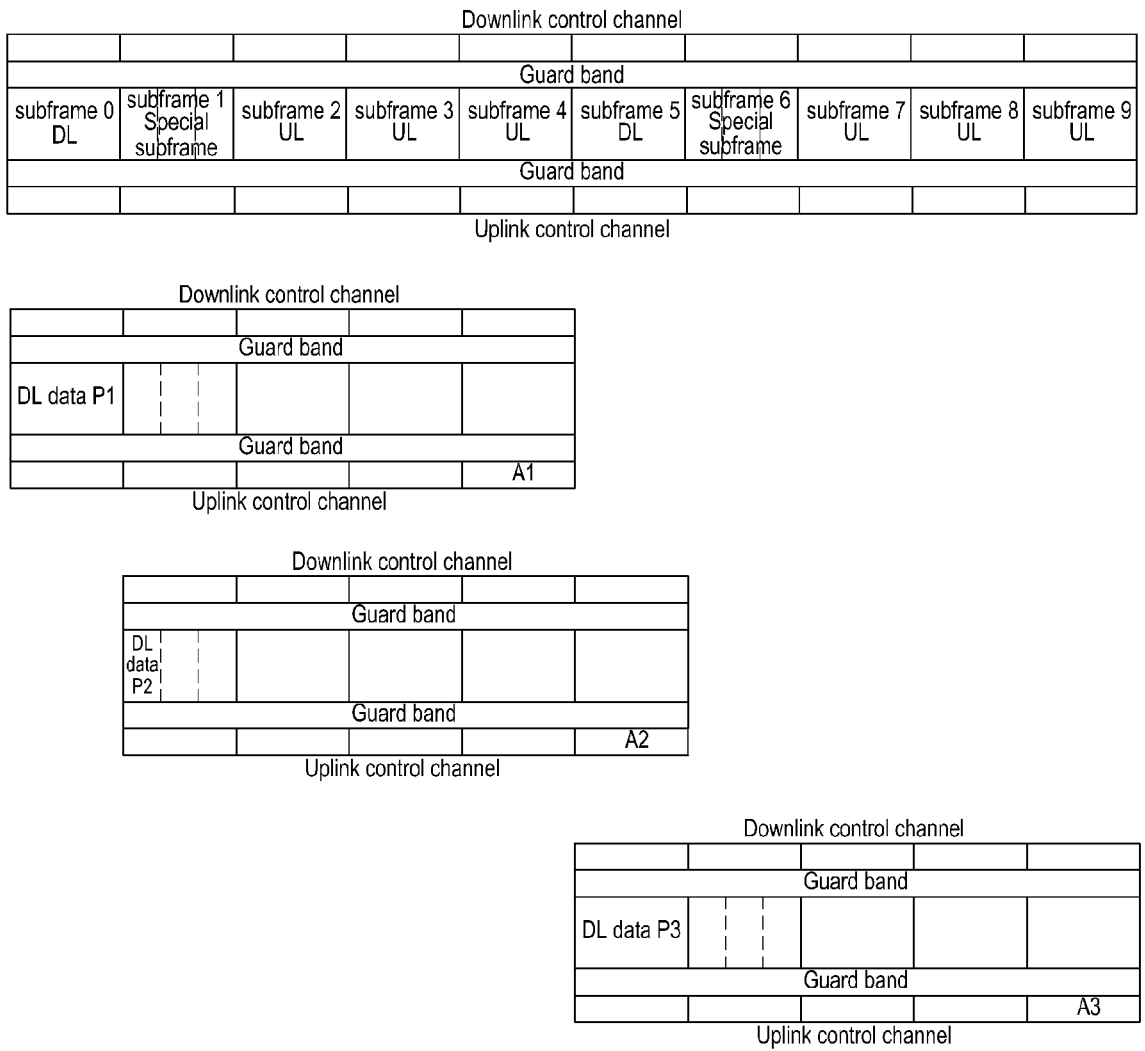
FIG. 15 is a schematic diagram illustrating a downlink HARQ timing sequence according to some embodiments of the present disclosure.

In the in-band hybrid duplex mode, the uplink and downlink control channels always exist. Therefore, the timing sequence confusion and low efficiency problems in the LTE TDD can be avoided. The downlink HARQ transmission adopts an asynchronous manner similar as the LTE, i.e., merely the timing sequence for transmitting ACK/NACK signal after the terminal receives a data packet is defined. After receiving the ACK/NACK signal transmitted by the terminal and determining to retransmit the data packet, the base station indicate, via an HARQ process number in the downlink control channel of a corresponding subframe, the current re-transmitted data packet corresponds to which data packet received by the terminal. Therefore, it is not required to define the timing sequence that the base station re-transmits data for the terminal, i.e., the base station can re-transmit data asynchronously. It is defined that the terminal feeds back ACK/NACK 0.3 ms after receiving the data packet. FIG. 15 shows one possible timing sequence of the downlink HARQ.

The first line in FIG. 15 is the uplink-downlink configuration utilized by this embodiment. In this configuration, subframes 0 and 5 in the data channel are used for downlink transmission, subframes 1 and 6 are used for special subframes, and other subframes are used for uplink transmission. Symbol "P" denotes downlink data transmission, and symbol "A" denotes ACK/NACK feedback of data P. It can be seen from FIG. 15 that, the ACK/NACK feedback of the data happens 3 subframes after the data subframe is received, i.e., 0.3 ms later. The ACK/NACK in the second line is taken as an example. The terminal receives downlink data P1 in subframe 0 and transmits, after processing, corresponding ACK/NACK signal to the base station in the uplink control channel of subframe 4. After processing, if finding that the data packet requires retransmission, the base station retransmits this data packet in the subframe after subframe 5, and indicates this to the terminal through inserting HARQ process number in the corresponding downlink control channel.

The HARQ feedback modes of different uplink-downlink configurations are similar, i.e., after data is transmitted in the downlink data communication subframe, the terminal transmits the ACK/NACK signal of the corresponding data packet in the uplink control channel after a certain period of time (0.3 ms in the example shown in FIG. 15). When retransmitting the data packet, the base station gives an indication to the terminal through inserting HARQ process number in the downlink control channel of the corresponding subframe.

Compared to the downlink HARQ timing sequence of the LTE TDD mode, the in-band hybrid duplex mode provided by the present disclosure does not have the situation that the uplink control channel resource is inadequate. Therefore, techniques such as ACK/NACK bundling or ACK/NACK multiplexing are not required, which makes the downlink HARQ feedback timely and not complex.

Figure 16:
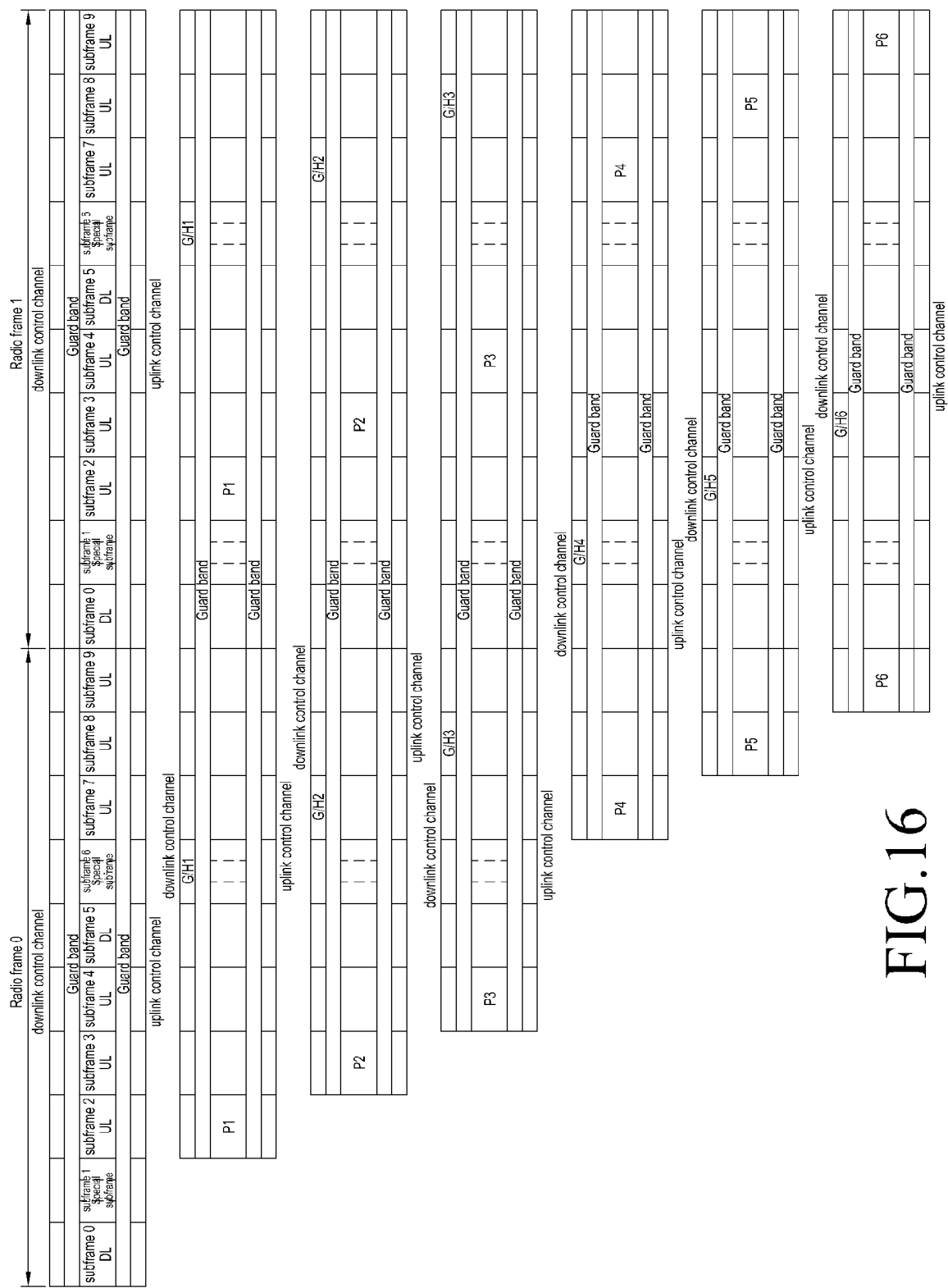
FIG. 16 is a schematic diagram illustrating an uplink HARQ timing sequence according to some embodiments of the present disclosure.

The uplink HARQ timing sequence adopts a manner similar as the LTE, i.e., after uplink grant or uplink ACK/NACK signaling is transmitted in the downlink, uplink data packet is transmitted in the data channel of an available uplink subframe after a defined time period. After receiving the uplink data packet, the base station transmits uplink grant or uplink ACK/NACK signal in the downlink control channel of a subframe after a predefined time period. FIG. 16 shows one possible uplink HARQ timing sequence according to some embodiments of the present disclosure. It is defined that the base station feeds back 0.3 ms after receiving the data. The terminal searches for available uplink subframes for uplink transmission 0.3 ms after receiving uplink grant or ACK/NACK.

In FIG. 16, P denotes uplink data packet which is transmitted using uplink subframes in the data channel. G/H denotes uplink grant or ACK/NACK signal. The first line in FIG. 16 is the uplink-downlink configuration utilized by this embodiment. Subframes 0 and 5 are used for downlink data communication. Subframes 1 and 6 are special subframes, and other subframes are used for uplink data communication. The HARQ timing sequence in the second line is taken as an example. The terminal transmits uplink data in subframe 2. After receiving processing, the base station transmits uplink grant or ACK/NACK signal in the downlink control channel of subframe 6. Since the subframe 0.3 ms later is a downlink subframe, the terminal transmits uplink data in subframe 2 of the second radio frame.

In the HARQ timing sequence as shown in the third line of FIG. 16, although the base station transmits the uplink grant or ACK/NACK signal in the subframe 7 of the first radio frame, the subframe 0.3 ms later is used for downlink data communication, and the first uplink data subframe 0.3 ms later, i.e., subframe 2 in the second radio frame has been used for HARQ feedback, therefore the terminal transmits uplink data in subframe 3 of the second radio frame.

It can be seen that, compared to the uplink HARQ timing sequence in LTE TDD, in the uplink HARQ timing sequence shown in FIG. 16, the base station is able to transmit uplink grant or ACK/NACK signal in the downlink control channel without the need of waiting for available downlink subframe. In the case that the downlink subframes have a low proportion, this method is able to shorten the HARQ waiting time. For example, in the example as shown in FIG. 16, the Round-Trip Time (RTT) is 1.0 ms, i.e., the length of one radio frame, which is shorter than the RTT of the LTE TDD mode with the same uplink-downlink configuration, and meets the 1 ms air interface latency required by 5G.

It should be noted that, the latency (0.3 ms) between the receiving of the data and the transmission of the ACK/NACK signal in this embodiment is merely an example. In a practical system, the latency can be determined according to a device processing capability and a practical frame structure.

Embodiment 6

This embodiment describes an access and communication procedure between the terminal and the base station in the in-band hybrid duplex mode provided by the present disclosure. The procedure includes the following.

The terminal finishes a cell searching procedure through receiving a synchronization channel and a broadcast channel in the center of the second subband, and obtains the system configuration information through reading the physical broadcast channel. The time-frequency position of the synchronization channel and the time-frequency position of the broadcast channel are preconfigured in the frame structure. The system configuration information includes at least one of: system bandwidth, uplink-downlink configuration, guard band configuration, and control channel frequency hopping configuration.

The terminal obtains the center frequency points and bandwidths of the uplink and downlink control channels, the center frequency and bandwidth of the data channel, and the uplink-downlink configuration according to the system configuration information in the physical broadcast channel.

The terminal obtains other system configuration information born by the downlink subframes of the data channel through the downlink control channel, and initiates and implements uplink access according to the other system configuration information.

The terminal communicates with the base station according to the appointed uplink-downlink configuration.

The system frame structure and the spectrum structure in this embodiment are the same as those in embodiment 1. The Primary Synchronization Signal (PSS), Secondary Synchronization Signal (SSS) and the Physical Broadcast Channel (PBCH) are all transmitted in the downlink subframe of the data channel and the downlink special slot in the adjacent special subframe.

Figure 17:
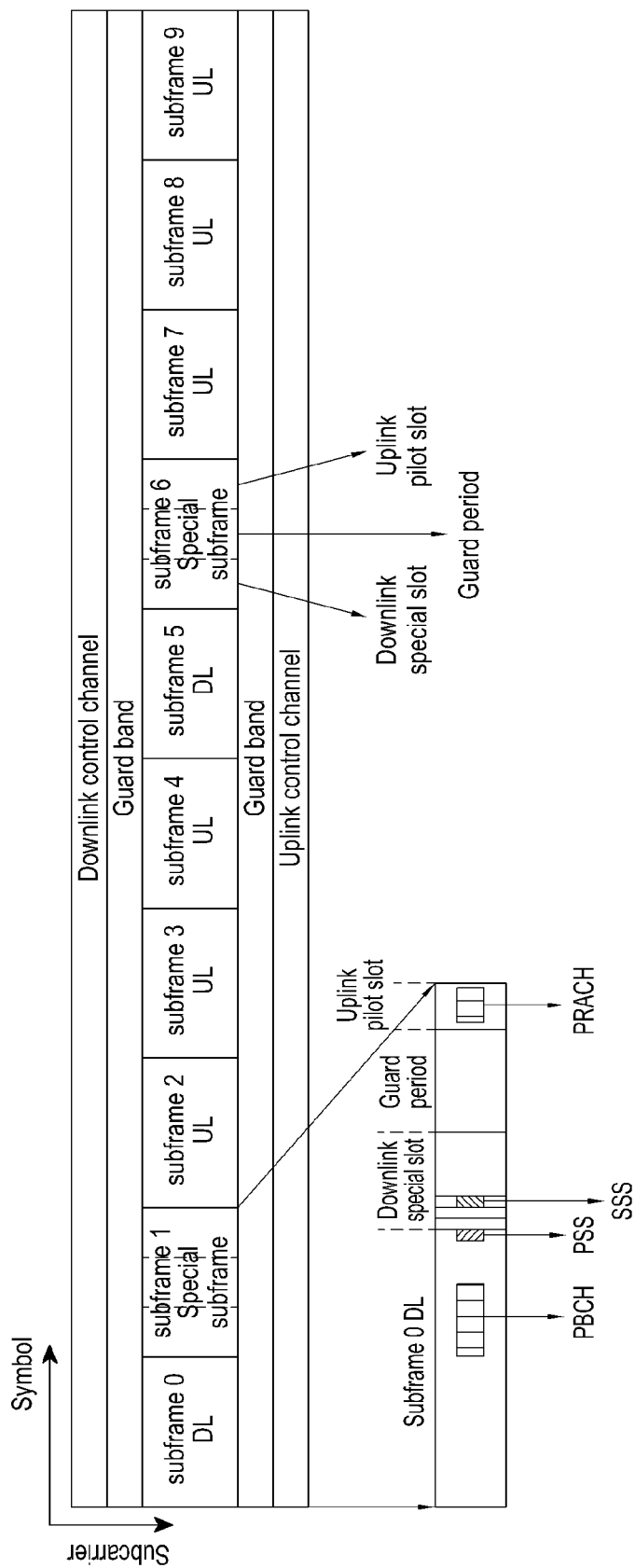
FIG. 17 is a schematic diagram illustrating structures of a synchronization channel and a broadcast channel according to some embodiments of the present disclosure.

The Physical Random Access Channel (PRACH) is transmitted in the uplink pilot slot of the special subframe, as shown in FIG. 17. FIG. 17 is a schematic diagram illustrating configurations of synchronization channel and the broadcast channel according to some embodiments of the present disclosure. The PSS and the SSS are used for cell search. The PBCH contains system information including system bandwidth and uplink-downlink configuration. The terminal finishes cell searching and system synchronization and obtains a cell ID through searching and detecting the PSS and the SSS after power on. Thereafter, the terminal reads the PBCH, and obtains system information such as system bandwidth, system frame number and system antenna configuration.

In addition, since the in-band hybrid duplex mode differentiates uplink and downlink data communications via a TDD manner, the terminal still needs to obtain the uplink-downlink configuration. This information can be provided to the terminal implicitly through the position of the special subframe, i.e., the base station merely needs to broadcast the position of the special subframe in the PBCH, and the terminal is able to determine the uplink-downlink configuration according to the position of the special subframe. The position of the special subframe can be provided to the terminal in form of a looking-up table, i.e., the position of the special subframe is stored in a looking-up table known by both the base station and the terminal. The base station merely transmits the index of the position of the special subframe in the PBCH.

Through this index, the terminal obtains the position of the special subframe, and lengths of the downlink special slot, the guard period and the uplink pilot slot in the special subframe, and obtains the uplink-downlink configuration. For example, as shown in FIG. 17, the terminal determines according to the index of the position of the special subframe that the subframes 1 and 6 are special subframes, and determines from a corresponding mode that subframes 1 and 5 are used for downlink data communication and subframes 2, 3, 4, 7, 8, 9 are used for uplink communication.

For the in-band hybrid duplex mode provided by the present disclosure, the mode of the guard bands between the control channels and the data channel needs to be provided to the terminal, i.e., whether the guard bands of the same bandwidth are adopted for different subframes and which mode of the guard band is adopted. Similar to the special subframe position information, the guard band mode is stored in the base station and the terminal in form of a looking-up table. The base station merely needs to broadcast the index of the guard band mode in the looking-up table through the PBCH. For example, in FIG. 17, the terminal determines that the system uses the guard bands of the same bandwidth according to the index of the guard band mode, and then deduces that the downlink control channel and the uplink control channel respectively occupies the 15 subcarriers on the two ends of the system bandwidth.

After obtaining the system bandwidth and the guard band bandwidth, the terminal is able to determine the data channel bandwidth and the position of the control channels. The terminal reads the downlink control channel and finishes uplink access through reading other system configuration information (such as random access configuration information, etc.) in the dynamic broadcast channel in the downlink subframes of the data channel, then communicates with the base station according to scheduling information of the base station (e.g., flexibly configured uplink-downlink configuration information) or appointed uplink-downlink configuration.

For the situation of the flexible uplink-downlink configuration as shown in embodiment 2, it is required to reserve time-frequency resources for the uplink physical random access channel. In order to avoid additional signaling overhead, before the terminal finishes the access, communication can be implemented according to the uplink-downlink configuration predefined in the PBCH.

Figure 18:
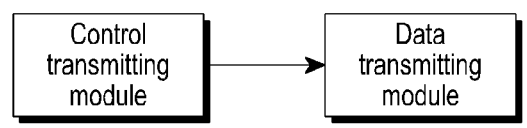
FIG. 18 is a schematic diagram illustrating a structure of a base station according to some embodiments of the present disclosure.

In accordance with the above method, the present disclosure also provides a base station. The structure of the base station is shown in FIG. 18. The base station includes a control transmitting module and a data transmitting module. The control transmitting module is adapted to respectively transmit an uplink control channel and a downlink control channel in a first subband and a third subband of an available un-paired spectrum, wherein control channels of reverse directions are transmitted in the first subband the third subband at the same time. The data transmitting module is adapted to transmit uplink data and downlink data according to a time division multiplexing mode in a second subband of the available un-paired spectrum, wherein the first subband and the third subband are respectively on the two ends of the available un-paired spectrum.

Figure 19:
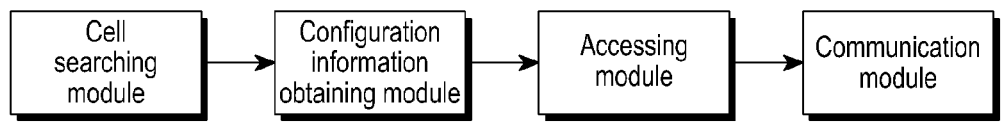
FIG. 19 is a schematic diagram illustrating a structure of a terminal device according to some embodiments of the present disclosure.

In accordance with the above method, the present disclosure also provides a terminal. The structure of the terminal is as shown in FIG. 19. The terminal includes a cell searching module, a configuration information obtaining module, an access module and a communication module. The cell searching module, the configuration information obtaining module and the access module can be implemented by one or more processors. The cell searching module is adapted to implement a cell searching procedure through receiving a synchronization channel and a broadcast channel in the center of a second subband, and obtain system configuration information through reading the physical broadcast channel. The time-frequency position of the synchronization channel and time-frequency position of the broadcast channel are predefined in a frame structure, and the system configuration information includes at least one of system bandwidth, uplink-downlink configuration, guard band configuration, and control channel frequency hopping configuration. The configuration information obtaining module is adapted to obtain a center frequency points and bandwidths of uplink and downlink control channels, a center frequency point and a bandwidth of a data channel, and an uplink-downlink configuration according to the system configuration information in the physical broadcast channel. The access module is adapted to obtain other system configuration information born by downlink subframes of the data channel according to the downlink control channel, and initiate and implement an uplink access according to the other system configuration information; and the communication module is adapted to communicate with the base station according to an appointed uplink-downlink configuration.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for communicating by a base station (BS) with a terminal in a wireless communication system, the method comprising:
   transmitting a downlink control channel in a first subband of an available un-paired spectrum to the terminal;
   receiving an uplink control channel in a third subband of the available un-paired spectrum from the terminal, while transmitting the downlink control channel; and
   transmitting downlink data on a data channel to the terminal and receiving uplink data on the data channel from the terminal in a time division multiplexing manner in a second subband of the available un-paired spectrum,
   wherein the first subband and the third subband are on two ends of the available un-paired spectrum.

2. The method of claim 1, wherein a first guard band exists between the first subband and the second subband, a second guard band exists between the second subband and the third subband, and no signal is transmitted in the first and second guard bands.

3. The method of claim 2, wherein a size of the first guard band or the second guard band is determined according to an interference level of adjacent subbands and an out-of-band leakage suppression technique being used.

4. The method of claim 2, further comprising:
   adjusting a size of the first guard band and second guard band through guard band mode by at least one of:
      inserting an additional guard band in at least one of subbands, wherein parameters being adjusted comprise a position and a size of the additional guard band inserted in the downlink and uplink control channels or the data channel; or
      adjusting a center frequency point of the data channel in at least one subframe of the second subband, wherein parameters being adjusted comprise an offset of the center frequency point of the data channel.

5. The method of claim 4, further comprising:
   adjusting a guard band mode dynamically according to uplink received signal strength; and
   indicating the guard band mode to the terminal through a predefined manner or a broadcast channel or the downlink control channel.

6. The method of claim 4, further comprising:
   storing a relationship between a guard band mode and an index of the guard band mode in a looking-up table; and
   indicating the guard band mode to the terminal through signaling the index of a currently utilized guard band mode within the looking-up table.

7. The method of claim 1, further comprising:
   notifying the terminal of a position and a bandwidth of each subband within the available un-paired spectrum, and an uplink-downlink configuration of the data channel; and
   communicating with the terminal according to an appointed transmission configuration.

8. The method of claim 1, wherein
the downlink control channel is used for transmitting downlink control signaling, wherein the downlink control signaling comprises at least one of resource allocation information, modulation and coding scheme information, hybrid automatic retransmission request acknowledgement/negative-acknowledgement information, an uplink transmission grant, or an uplink transmission power control indication;
the uplink control channel is used for receiving uplink control signaling, wherein the uplink control signaling comprises at least one of scheduling request, hybrid automatic retransmission request acknowledgement/negative-acknowledgement information, or a channel state information; and
the second subband is used for receiving the uplink data and transmitting the downlink data, and is further used for transmitting at least one of a synchronization channel, a broadcast channel for transmitting system information, or an uplink random access channel.

9. The method of claim 1, further comprising:
transmitting at least one of an uplink switch indication or a downlink switch indication in the downlink control channel, to change a transmission direction of subframes in the data channel.

10. The method of claim 9, further comprising:
transmitting at least one uplink switch indication in a downlink control channel of each radio frame, and at least one subframe in the data channel is used for uplink data communication.

11. The method of claim 1, further comprising:
inserting a guard interval at a downlink-to-uplink switching point in the data channel, wherein no signal is transmitted during the guard interval.

12. The method of claim 11, further comprising:
inserting a special subframe at the downlink-to-uplink switching point in the data channel,
wherein the special subframe comprises a downlink special slot, a guard period and an uplink pilot slot,
wherein the downlink special slot is used for downlink communication, and at least one of a downlink data channel, a physical synchronization channel and a physical broadcast channel is transmitted in the downlink special slot,
wherein the uplink pilot slot is used for conveying a sounding pilot signal, and
wherein no signal is transmitted during the guard period.

13. The method of claim 1,
wherein a filtered or filter-bank single carrier or a filtered or filter-bank multicarrier modulation is adopted for each subband,
wherein the filtered or filter-bank single carrier or filtered or filter-bank multicarrier modulation comprises any one of filter-bank multicarrier(FBMC), filtered-OFDM, or single-carrier filter-bank multicarrier (SC-FBMC).

14. A method for communicating by a terminal with a base station (BS) in a wireless communication system, the method comprising:
receiving a downlink control channel in a first subband of an available un-paired spectrum from the BS;
transmitting an uplink control channel in a third subband of the available un-paired spectrum to the BS, while receiving the downlink control channel; and
receiving downlink data on a data channel from the BS and transmitting uplink data on the data channel to the BS in a time division multiplexing manner in a second subband of the available un-paired spectrum,
wherein the first subband and the third subband are on two ends of the available un-paired spectrum.

15. The method of claim 14, further comprising:
implementing a cell searching procedure through receiving a synchronization channel and a broadcast channel in a center position of a second subband, and obtaining system configuration information through reading the broadcast channel;
obtaining a center frequency point position and a bandwidth of an uplink control channel and a downlink control channel, a center frequency point and a bandwidth of a data channel, and an uplink-downlink configuration, according to the system configuration information in the broadcast channel;
obtaining other system configuration information born by downlink subframes of a data channel through the downlink control channel, and initiating an uplink access according to the other system configuration information; and
communicating with the BS according to an appointed uplink-downlink configuration,
wherein a time-frequency position of the synchronization channel and a time-frequency position of the broadcast channel are preconfigured in a frame structure, and
wherein the system configuration information comprises at least one of: system bandwidth, uplink-downlink configuration, guard band configuration, and control channel frequency hopping configuration.

16. The method of claim 15, further comprising:
obtaining the uplink-downlink configuration, the guard band configuration and the control channel frequency hopping configuration through receiving an index from the BS respectively, based on predefined looking-up table.

17. The method of claim 15, further comprising:
determining a hybrid automatic retransmission request acknowledgement/negative acknowledgement (HARQ ACK/NACK) position according to a position of subframes used for uplink and downlink data communications in the data channel.

18. A base station (BS) communicating with a terminal in a wireless communication system, the BS comprising:
a transceiver is configured to:
transmit a downlink control channel in a first subband of an available un-paired spectrum to the terminal, receive a uplink control channel in a third subband of the available un-paired spectrum from the terminal and transmit downlink data on a data channel to the terminal and receive uplink data on the data channel from the terminal in a time division multiplexing manner in a second subband of the available un-paired spectrum; and
a controller is configured to control the transceiver to transmit the downlink control channel and receive the uplink control channel at a same time,
wherein the first subband and the third subband are on two ends of the available un-paired spectrum.

19. A terminal communicating with a base station (BS) in a wireless communication system, the terminal comprising:
a transceiver is configured to:
receive a downlink control channel in a first subband of an available un-paired spectrum from the BS, transmit an uplink control channel in a third subband of the available un-paired spectrum to the BS and receive downlink data of a data channel from the BS and transmit uplink data of the data channel to the BS in a time division multiplexing manner in a second subband of the available un-paired spectrum; and a controller is configured to control the transceiver to receive the downlink control channel and transmit the uplink control channel at a same time, wherein the first subband and the third subband are on two ends of the available un-paired spectrum.

20. A spectrum structure for communicating between a terminal and a base station (BS) in a wireless communication system, the spectrum structure comprising:

a first subband is configured to transmit a downlink control channel from the BS to the terminal;

a second subband is configured to transmit uplink data on a data channel from the terminal to the BS and downlink data on the data channel from the BS to the terminal in a time division multiplexing manner; and a third subband is configured to transmit an uplink control channel from the terminal to the BS, while the downlink control channel is being transmitted, wherein the first subband and the third subband are on two ends of the spectrum structure, and wherein a first guard band exists between the first subband and the second subband, a second guard band exists between the second subband and the third subband, and no signal is transmitted in the first and second guard band.

* * * * *